US008456695B2

(12) United States Patent
Miyamura

(10) Patent No.: US 8,456,695 B2
(45) Date of Patent: Jun. 4, 2013

(54) IMAGE PROCESSING DEVICE FOR JUDGING WHETHER OR NOT INPUT PIXELS SATISFY AN ACHROMATIC CONDITION

(75) Inventor: Norihide Miyamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 921 days.

(21) Appl. No.: 12/285,210

(22) Filed: Sep. 30, 2008

(65) Prior Publication Data

US 2009/0161184 A1    Jun. 25, 2009

(30) Foreign Application Priority Data

Dec. 21, 2007    (JP) .................. 2007-330617

(51) Int. Cl.
*H04N 1/60*    (2006.01)
(52) U.S. Cl.
USPC .............................. 358/1.9; 358/2.1; 358/518
(58) Field of Classification Search
CPC ................... H04N 1/58; H04N 1/6022
See application file for complete search history.

(56) References Cited

U.S. PATENT DOCUMENTS

| | | | | |
|---|---|---|---|---|
| 5,231,482 A * | 7/1993 | Murakami et al. | ............. | 358/500 |
| 5,729,624 A * | 3/1998 | Tanioka et al. | ............... | 382/162 |
| 5,786,906 A * | 7/1998 | Shishizuka | .................... | 358/500 |
| 6,504,628 B1 * | 1/2003 | Kanno et al. | ................... | 358/522 |
| 7,012,713 B1 * | 3/2006 | Hiruma | ......................... | 358/1.9 |
| 7,142,329 B2 * | 11/2006 | Kawai et al. | ................... | 358/2.1 |
| 7,327,492 B2 * | 2/2008 | Yokochi | ....................... | 358/1.9 |
| 7,339,703 B2 * | 3/2008 | Kagawa | ......................... | 358/1.9 |
| 7,565,007 B2 * | 7/2009 | Ishiga | ........................... | 382/162 |
| 7,612,910 B2 * | 11/2009 | Oki | ................................ | 358/1.9 |
| 7,876,961 B2 * | 1/2011 | Miyagi | ......................... | 382/190 |
| 2003/0202196 A1 * | 10/2003 | Ooki | .............................. | 358/1.9 |
| 2004/0257621 A1 * | 12/2004 | Ishihara | ........................ | 358/2.1 |
| 2007/0121136 A1 * | 5/2007 | Gotoh et al. | ................... | 358/1.9 |

FOREIGN PATENT DOCUMENTS

JP    10-126636    5/1998

* cited by examiner

*Primary Examiner* — Dung Tran
(74) *Attorney, Agent, or Firm* — Posz Law Group, PLC

(57) ABSTRACT

An image processing device for converting input image data in input color space into output image data in output color space comprises an input unit configured to input a plurality of input pixel signals comprising the input image data, a designation unit configured to designate an achromatic condition for pixels corresponding to the plurality of input pixel signals, and an achromatic judgment unit configured to judge whether or not each of the plurality of input pixel signals input by the input unit satisfies the achromatic condition, wherein the achromatic judgment unit judges that a pixel which corresponds to a particular input pixel signal is an achromatic pixel where the particular input pixel signal satisfies the achromatic condition.

9 Claims, 18 Drawing Sheets

| i \ (j, K) | (1, 1) | (2, 1) | ... |
|---|---|---|---|
| 1 | 1 | 1 | ... |
| 2 | 0 | 1 | ... |
| 3 | 1 | 1 | ... |
| ⋮ | ⋮ | ⋮ | ⋮ |

Fig.5

IMAGE PROCESSING DEVICE FOR JUDGING WHETHER OR NOT INPUT PIXELS SATISFY AN ACHROMATIC CONDITION

CROSS REFERENCE TO RELATED APPLICATION

The present application is related to and claims priority to Japanese Patent Application No. 2007-330617, filed on Dec. 21, 2007, the contents of which are incorporated by reference.

TECHNICAL FIELD

The present invention relates to image processing, and particularly to an image processing device and method that execute color converting processes to convert input image data to output image data.

BACKGROUND

Displays or printing devices, hereinafter image output devices, have been utilized to output color image data. These image output devices respectively have unique varying color ranges for reproduction due to differences of data output methods or systems. For example, monitors are able to reproduce a vivid color image or chromatic image because the monitors adopt an additive color mixing using light to reproduce colors. On the other hand, printers, in general, have difficulty in reproducing an image with higher luminosity and color, and have a narrower color reproduction region compared with the monitors because the printers utilize a subtractive color mixing in which colored materials, such as toner and ink, are layered.

As explained above, color reproduction regions vary according to the type of image output device. Therefore, when different types of image output devices execute an output process for the same image data, for example, when a colored image displayed on a monitor is to be output by a printer, there is likelihood that some colors may not be output with either of the image output devices. To solve the difficulty, it is necessary to convert these colors which are not able to be output into other colors which are possible for reproduction.

In order to deal with the above difficulty, an image processing device has been used by which input image data generated in a color reproduction region at an input side is copied to a color reproduction region at an output side and then converted to image data for outputting. For example, a color image processing method is known in which input color signals are compressed, copied, and converted into output color signals based on differences of color reproduction regions where the color reproduction region for the output color signals are relatively narrower than the color reproduction regions for the input color signals.

People have different color sensitivities. However, the color image processing method described above uniformly copies, compresses, and converts all the input color signals into the output color signals with a given ratio of compression. Due to the uniform ratio, such a method may reproduce images that are generally acceptable to all users.

However, there is a need for a new image processing device in which the color converting process is based on a user's subjective preference (or user's sensitivities).

SUMMARY

In view of the above, the invention is an image processing device for converting input image data in input color space into output image data in output color space comprising an input unit configured to input a plurality of input pixel signals comprising the input image data, a designation unit configured to designate an achromatic condition for pixels corresponding to the plurality of input pixel signals, and an achromatic judgment unit configured to judge whether or not each of the plurality of input pixel signals input by the input unit satisfies the achromatic condition, wherein the achromatic judgment unit judges that a pixel which corresponds to a particular input pixel signal is an achromatic pixel where the particular input pixel signal satisfies the achromatic condition.

Further, the designation unit includes a color converter which executes a color convert process while identifying the achromatic region designated by the designation unit as achromatic.

According to the image processing device, the achromatic conditions in the input color space are designated by an operation by the user. It is possible to reflect the user's subjective preference in the color converting process from the input image data to the output image data. Accordingly, it is possible to increase the user's satisfaction with the reproduced images. The achromatic condition is defined by various types of conditional data or equations which are used to judge whether or not a pixel is achromatic. For example, an achromatic judgment constitutive equation, a constitutive logical equation, or a combination of equations is practical.

Hereinafter, exemplary embodiments will be described with reference to the appended drawings. Especially, the explanation is directed to exemplary embodiments in which an image processing device is used at a data input side.

DESCRIPTION OF THE DRAWINGS

FIG. 5 is an explanatory diagram showing a part of the judgment result memory of the first embodiment.

DETAILED DESCRIPTION

First Embodiment

Figure 2:
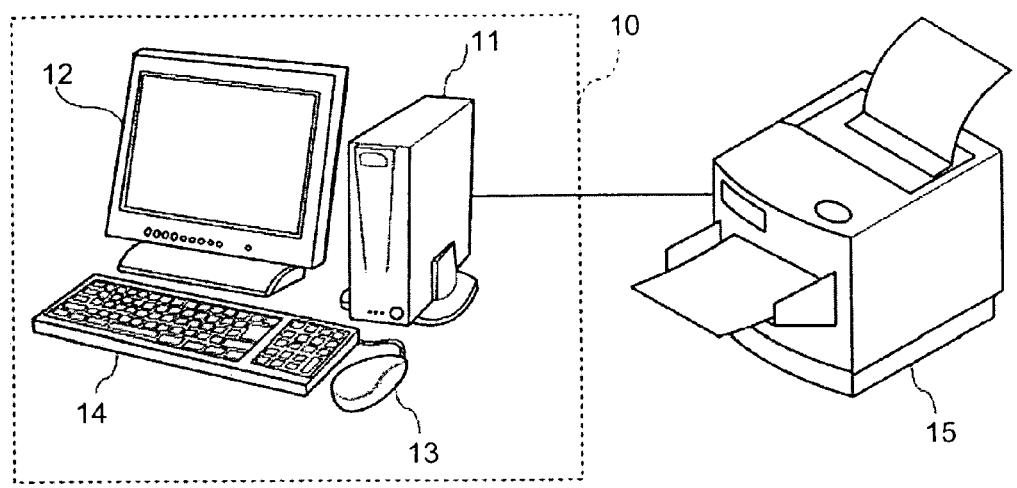
FIG. 2 is a schematic view showing a configuration of the image processing device of FIG. 1.

As shown in FIG. 2, image processing device 10 is configured with personal computer 11, monitor 12, mouse 13 (a computing pointing device), and keyboard 14. Color printer 15 is connected to image processing device 10. With image processing device 10, image data of a color image displayed on monitor 12 as a display is chromatically (color) converted and output. Then, the image data is printed with color printer 15 as an output device.

Figure 1:
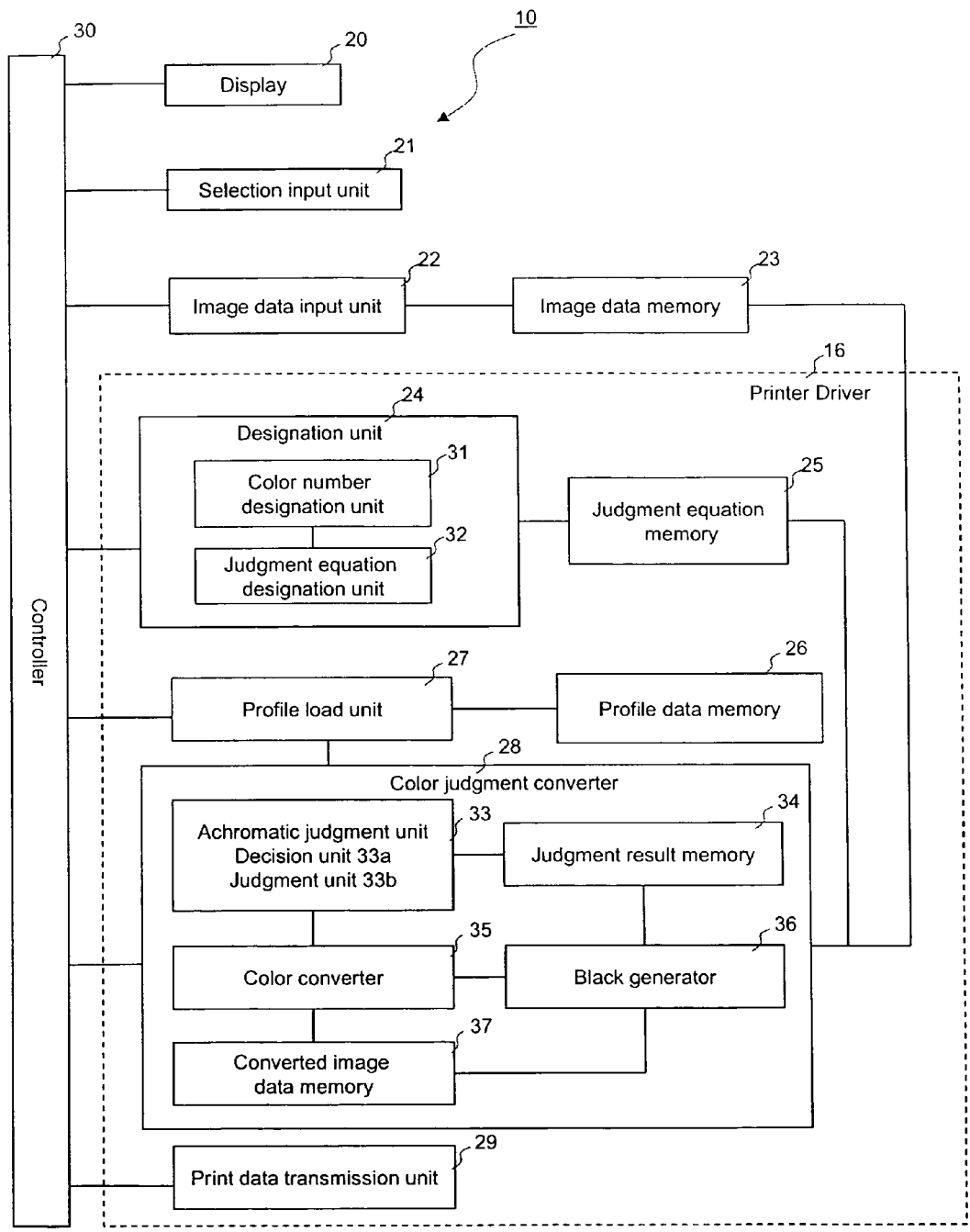
FIG. 1 is a block diagram describing functional configurations of an image processing device of a first exemplary embodiment.

Referring to FIG. 1, image processing device 10 is configured with display 20, selection input unit 21, image data input unit 22, image data memory 23, designation unit 24, judgment equation memory 25, profile data memory 26, profile load unit 27, color judgment converter 28, print data transmission unit 29, and controller 30. Specifically, when specific printer driver 16 is installed and the property of printer driver 16 is selected, it controls designation unit 24, judgment equation memory 25, profile data memory 26, profile load unit 27, color judgment converter 28, and print data transmission unit 29 for performing the following processes.

Referring to FIGS. 1 and 2, display 20 includes monitor 12 and is configured to display the color images and any types of user interface screens.

Selection input unit 21 includes mouse 13 and keyboard 14 and is configured to execute data input processes for input data or selection data in correspondence with a user's operation. The user, for example, operates mouse 13 or keyboard 14 in correspondence with the user interface screen pictures displayed on display 20 in order to set conditions for printer 15 with respect to a printing process, or in order to designate an achromatic region (hereinafter described) in input color space. Then, selection input unit 21 sends the input data or the selection data to controller 30 in response to the user's operations.

Image data input unit 22 as a data input device functions to input image data to image data memory 23. The image data is with respect to color images displayed on display 20, or is delivered from an image scanner or a digital still camera through an interface device not shown in the drawings. The input image data is bit map data composed of input pixel signals corresponding to each pixel of the colored image, and is input to and stored in image data memory 23. Hereinafter, the colored image corresponding to the input image data is referred to as the input image.

Image data memory 23 is a volatile memory, and stores the input image data which is input via image data input unit 22.

Designation unit 24 functions to designate an achromatic region in the input color space according to the input operations by selection input unit 21, and as shown in FIG. 1, includes color number designation unit 31 and judgment equation designation unit 32. Herein, the input color space such as RGB, CMYK, or L*a*b* etc. is a color space including a color reproducing region on the device, which processes the images. Further, the achromatic region is an area judged as achromatic within the colored reproducing region.

Color number designation unit 31 is configured to designate a color number defining the number of primary colors (or elemental colors) in the input color space. Herein, the color number is numeric data indicating color signals which define the color space. For example, in RGB color space which is commonly used to a monitor of a personal computer, any colors are realized with color signals of three primary colors of light, R (red), G (green), and B (blue). Accordingly, the color number of the RGB color space is defined as "3 (three)." Also, in CMYK color space which is commonly used in printing devices, any colors are realized either by using four colored toners or inks, i.e. C (cyanogens), M (magenta), Y (yellow), and K (black), or by layering some of the toners or inks. Accordingly, the color number of the CMYK color space is defined as "4 (four)."

Figure 3:
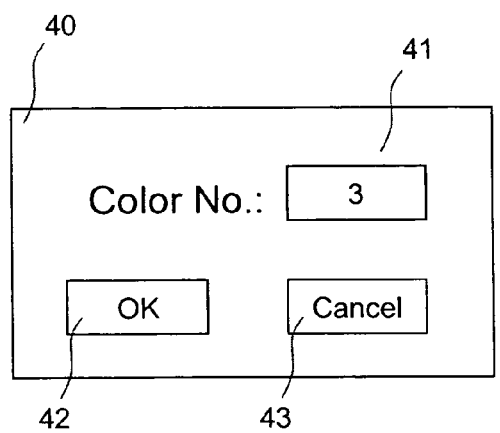
FIG. 3 is an explanatory diagram showing a configuration (a screen image) of a color number designation screen of FIG. 1.

Referring now to FIGS. 1 and 3, the designation of the color number by color number designation unit 31 is executed through a color number designation screen displayed on display 20.

Color number designation screen 40, as shown in FIG. 3, includes color number input region 41 for inputting a color number. Further, color number designation screen 40 has "OK" button 42 for selecting a designation process of the color number, and "Cancel" button 43 for selecting a cancelling the designation process.

On color number designation screen 40, when the user operates mouse 13 and keyboard 14, to input, for example, "3" in color number input region 41, and clicks "OK" button 42, selection input unit 21 inputs "3," as the color number designation data to designate the color number, to controller 30. Then, color number designation unit 31 designates the input color number designation data "3" as a color number N of the input color space under the control of the controller 30, and informs judgment equation designation unit 32.

Judgment equation designation unit 32 includes a function for designating an achromatic judgment equation. The achromatic judgment equation includes multiple achromatic judgment constitutive equations (AJC equations) and a single constitutive logical equation (CL equation). As described later, the achromatic judgment equation is used by color judgment converter 28 in order to judge whether or not each pixel of the input image is an achromatic pixel.

The AJC equation is designated in the present embodiment in the form of a conditional equation "$L_i \leq a_{i1}x_1 + a_{i2}x_2 + \ldots + a_{iN}x_N \leq H_i$."Herein, the subscript "i" respectivly attached to the symbols is an identification number (hereinafter as ID number) which is attached to the AJC equation by judgment equation designation unit 32. Also, the subscript "N" is color number designation data which is provided from color number designation unit 31 and which corresponds to the color number of the input color space.

At the AJC equation, "$x_1, x_2 \ldots x_N$" are input color signal values included in the input pixel signals corresponding to pixels which are targets for the judgment process. For example, where the color number is designated as N=3, the input image data to be input, as bit map data, by image data input unit 22 is composed of the input pixel signals $(x_1, x_2, x_3)$ corresponding to each pixel. The above AJC equation functions as a conditional equation for the input color signal values, "$x_1, x_2, x_3$." Herein, symbols "$a_{i1}, a_{i2}, \ldots a_{iN}$" are weighting coefficients assigned to each of the input color signal values "$x_1, x_2, \ldots x_N$." Using the AJC equations, judgment equation designation unit 32 designates the following with respect to the input color signal values $(x_1, x_2, \ldots x_N)$ included in each of the input pixel signals; its primary combined equation, "$a_{i1}x_1+a_{i2}x_2+\ldots+a_{iN}x_N$," a lower limit $L_i$ and an upper limit $H_i$ with respect to the primary combined equation.

Further, the CL equation is composed, for example in form of "1AND2" or "1OR2," including ID numbers i=1, 2, ..., which are attached to each AJC equation, and logical operators, for example "AND or OR," indicating combined relations between each of the AJC equations. Herein, "1AND2" means a condition in which both the AJC equations indicated by the ID number i=1 and 2 are satisfied. "1OR2" means a condition in which at least one of any AJC equations indicated by the ID number i=1 or 2 is satisfied.

Figure 4:
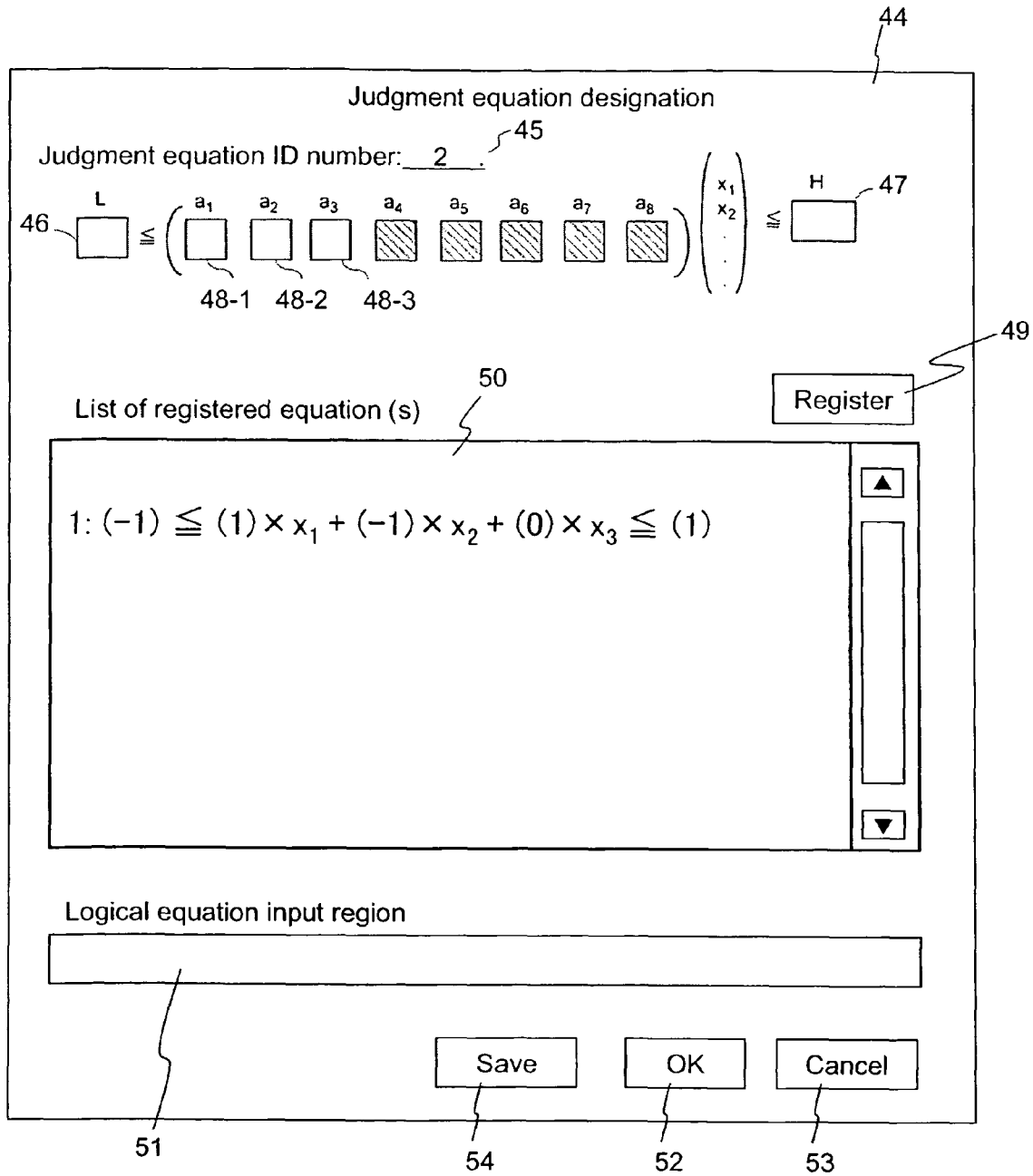
FIG. 4 is an explanatory diagram showing a structure of a judgment equation designation screen of the image processing device of FIG. 2.

Referring to FIG. 4, designation of the achromatic judgment equation by judgment equation designation unit 32 is executed via a judgment equation designation screen displayed on display 20.

As shown in FIG. 4, judgment equation designation screen 44 includes identification number display region 45 (ID number display region) displaying the ID numbers "i." Also, corresponding to the AJC equations to which the ID number "i" is attached, judgment equation designation screen 44 includes lower limit input region 46 for inputting the lower limit $L_i$, upper limit input region 47 for inputting the upper limit Hi, and coefficient input regions 48-1, 48-2 . . . for inputting the weighting coefficients $a_{i1}, a_{i2}, \ldots a_{iN}$. Further, judgment equation designation screen 44 includes "Register" button 49 for selecting a registration of the AJC equation corresponding to the ID number i. Further, in the screen 44, list display region 50 is shown for displaying a list of registered AJC equations.

For example, in a condition where "1" as an ID number i is shown in ID number display region 45, "−1" as the lower limit $L_1$ in lower limit input region 46 and "1" as the upper limit $H_1$ in upper limit input region 47 are respectively input, and "1," "−1" and "0" are respectively input as the weighting coefficients in coefficient input region 48-1, 48-2, and 48-3. Then, after "Register" button 49 is clicked, the ID number "1" and an AJC equation "$(-1) \leq (1) \times x_1 + (-1) \times x_2 + (0) \times x_3 \leq (1)$" corresponding to the ID number "1" are shown in list display region 50. Further, the ID number shown in ID number display region 45 is incremented from "1" to "2."

Further, as shown in FIG. 4, in judgment equation designation screen 44, logical equation input region 51 is shown, which is for inputting the CL equations. Judgment equation designation screen 44 includes the following in order to designate each of the AJC equations shown in list display region 50 and the CL equation input in logical equation input region 51 as the achromatic judgment equation:
* "OK" button 52 for selecting a designating execution;
* "Cancel" button 53 for selecting a cancel of the designating execution; and
* "Save" button 54 for designating the achromatic judgment equation and for selecting the file saving (storing) of the achromatic judgment equation.

For example, where list display region 50 shows ID number "1," an AJC equation, "$(-1) \leq (1) \times x_1 + (-1) \times x_2 + (0) \times x_3 \leq (1)$," which corresponds to the ID number "1," ID number "2," and an AJC equation, "$(-1) \leq (0) \times x_1 + (1) \times x_2 + (-1) \times x_3 \leq (1)$," which corresponds to the ID number "2," and where "1AND2" is input as the CL equation into logical equation input region 51, then "OK" button 52 is clicked, judgment equation designation unit 32 designates these AJC equations and CL equation, "1AND2," as the achromatic judgment equation, and sends these equations to judgment equation memory 25.

In addition, the above described achromatic judgment equation means that a pixel corresponding to the input pixel signal is judged as an achromatic pixel only in case that each of the input color signal values, $x_1$, $x_2$ or $_3$, included in the input pixel signal $(x_1, x_2, x_3)$ satisfies both the equations: the AJC equations "$(-1) \leq x_1 - x_2 \leq 1$" corresponding to ID number "1" and the AJC equation "$-1 \leq x_2 - x_3 \leq 1$" corresponding to ID number "2." Further, where the logical equation (or CL equation) which is included in the achromatic judgment equation is "1OR2," the achromatic judgment equation means that a pixel corresponding to the input pixel signal is judged as an achromatic pixel in case that each of the input color signal values, $x_1$, $x_2$ or $x_3$, included in the input pixel signals satisfies at least one of the two AJC equations.

Referring to FIG. 1, judgment equation memory 25 is a volatile memory and a nonvolatile memory, and is configured as a memory region to store the achromatic judgment equation designated by judgment equation designation unit 32. In judgment equation memory 25, a memory region of the volatile memory functions as a temporary memory region, and the other memory region made of the nonvolatile memory functions as a file storing region. In judgment equation designation screen 44 (see FIG. 4), when "OK" button 52 is clicked, judgment equation designation unit 32 stores the designated achromatic judgment equation in the temporary memory region. Further, in judgment equation designation screen 44 (see FIG. 4), when "Save" button 54 is clicked, judgment equation designation unit 32 executes a file storing process to store the designated achromatic judgment equation in the file storing region.

Profile data memory 26 is a nonvolatile memory, and is configured as a memory region in which several types of profiles are stored in advance. In profile data unit 26, for example, profile data corresponding to the color reproducing region of each output device, e.g. monitor 12, color printer 15 etc., is respectively stored to correspond to the device ID information.

Profile load unit 27 reads an input profile from profile data memory 26 and loads (stores) the profile based on the file name informed by controller 30, wherein the input profile is profile data corresponding to the color reproducing region on the input side. Also, profile load unit 27 reads an output profile from profile data memory 26 and loads (stores) the profile based on the device ID information provided by controller 30. The output profile is profile data corresponding to the color reproducing region on the output side. Then, profile load unit 27 creates a look-up table for a color convert process based on the loaded input and output profiles. The look-up table functions to define a corresponding relation between color signals in the input color space and color signals in the output color space. The look-up table is referenced during the color converting processes by color judgment converter 28 as described later.

Color judgment converter 28 is configured to generate converted image data by executing the color converting processes of the input image data. As shown in FIG. 1, color judgment converter 28 includes achromatic judgment unit 33, judgment result memory 34, color converter 35, black generator 36, and converted image data memory 37.

Each process performed by achromatic judgment unit 33, color converter 35, and black generator 36 in color judgment converter 28 is executed along a main scanning direction and a sub scanning direction in turn with respect to all the pixels which form an input image. Herein, positional data identifying a position of each of the pixels in the input image is represented (j, k) based on data defined with the main and sub scanning directions, where, "j" represents "1, 2 . . ." and "k" represents "1, 2, . . ." Further, a pixel corresponding to a position (j, k) is represented as pixel (j, k).

Achromatic judgment unit 33 is configured, as decision unit 33a and judgment unit 33b, to judge whether or not each of the pixels composing the input image is an achromatic pixel. It is noted that decision unit 33a and judgment unit 33b may be performed as a single unit.

Achromatic judgment unit 33 judges whether or not the input color signal values included in each of the input image signals satisfy each of the AJC equations. Achromatic judgment unit 33 reads each of the input color signal values ($x_1$, $x_2$, ... $x_N$) from the input image data stored in image data memory 23, the input color signal values of the input image signals ($x_1$, $x_2$, ..., $x_N$) corresponding to a pixel (j, k) which is a target of the judgment process. Then, achromatic judgment unit 33 judges whether or not these read-out input color signal values satisfy each of the AJC equations stored in judgment equation memory 25. Further, achromatic judgment unit 33 stores the judgment results in judgment result memory 34 in a manner which the ID number "i" of each AJC equation corresponds to the positional data (j, k) of the judgment target pixels.

Judgment result memory 34 is composed of a volatile memory, and functions as a memory region for storing the judgment results by achromatic judgment unit 33.

Figure 5:
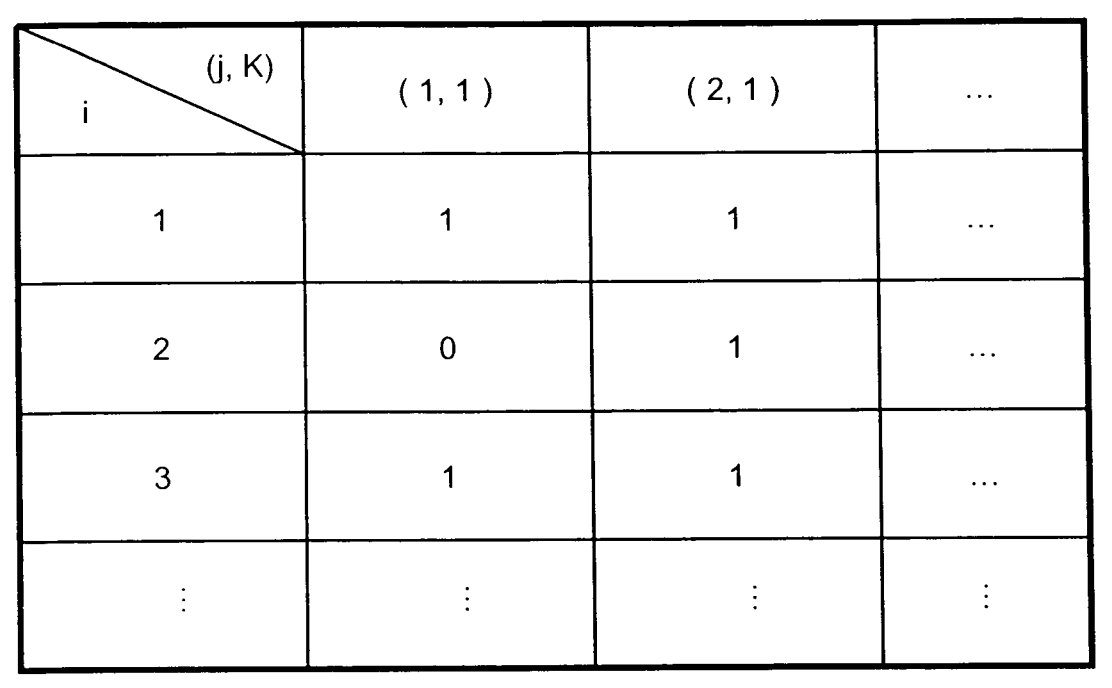

As shown in FIG. 5, judgment result memory 34 stores the judgment results, as either "1" or "0," of achromatic judgment unit 33. The results correspond to the positional data (j, k) identifying each of the pixels and the ID number "i" of each of the AJC equations. Herein, the data "1" of the judgment result represents "true." Specifically, the data "1" means that each of the input color signal values of the corresponding input pixel signals satisfies the corresponding AJC equation. On the other hand, the data "0" represents "false." Specifically, the data "0" means that each of the input color signal values of the corresponding input pixel signals do not satisfy the corresponding AJC equation.

For example, in FIG. 5, the judgment results of the pixel corresponding to positional data (1,1) are "1" with respect to ID number i=1, "0" with respect to i=2, and "1" with respect to i=3. These results mean that the input color signal values of the input pixel signals corresponding to the pixel respectively satisfy the AJC equations attached with the ID number i=1 and 3. However, the input color signal values do not satisfy the AJC equation attached with the ID number i=2.

Further, achromatic judgment unit 33 reads the CL equation from judgment equation memory 25, and judges whether or not each of the pixels is an achromatic pixel based on the CL equation and the stored judgment results in judgment result memory 34. Achromatic judgment unit 33 stores the results in judgment result memory 34 in a manner that relates the results with the positional data (j, k) of the pixels.

Referring back to FIG. 1, color converter 35 is configured to chromatically convert (or color convert) each of the input color signal values of the input pixel signals composing the input image data into the chromatic signal values in the output color space. In the present embodiment, CMYK color space is adopted as the output color space by color printer 15. Herein, the CMY are values that correspond to the chromatic signal values, and K value corresponds to the achromatic signal value among the CMYK values. Color converter 35 converts each of the input color signal values into the CMY values.

Color converter 35 reads each of the input color signal values of the input image signals corresponding to the pixel (j, k) which is a converted target from the stored input image data in image data memory 23. Then, color converter 35 refers to the look-up table generated by profile load unit 27, and converts these input color signal values into CMY values. Namely, the input pixel signals ($x_1$, $x_2$, ..., $x_N$) generated in the input color space of the color number N are converted to the converted pixel signals (C, M, Y) in the CMY space. The converted image data composed of each of the converted pixel signals which are obtained by the convert processes is stored in converted image data memory 37.

Black generator 36 is configured to create achromatic signal value K based on the converted pixel signals (C, M, Y) corresponding to each of the pixels, and converts the converted pixel signals (C, M, Y) into the output pixel signals (C', M', Y', K).

Black generator 36 reads out the results of whether a targeted pixel (j, k) is an achromatic pixel or not. Where the pixel (j, k) is the achromatic pixel, black generator 36 converts the CMY values so that each of the values is equal (C=M=Y). The CMY values are the converted color signals values which correspond to the pixel and which are stored in converted image data memory 37. Namely, black generator 36 calculates an average of the CMY values (the average A=(C+M+Y)/3), and replaces each of the converted color signal values stored in converted image data memory 37 with the average A so that the converted pixel signals become (A, A, A).

Further, black generator 36 converts each of the converted image signals from CMY values to CMYK values. Namely, black generator 36 creates achromatic signal value K from the converted color signal values C, M, Y of the converted pixel signals (C, M, Y) which are stored in converted image data memory 37. Then, black generator 36 converts the converted pixel signals (C, M, Y) into the output pixel signals (C', M', Y', K) which are composed of the CMYK values including the K value. The output image data composed of each of the output pixel signals obtained by the converting process are stored in converted image data memory 37.

Converted image data memory 37 is composed of the volatile memory, and is a memory region for storing bit map data, such as the converted image data or the output image data etc. Converted image data memory 37 stores the CMY values or the CMYK values, wherein the CMY values are the converted color signal values of the converted pixel signals (C, M, Y) created by color converter 35, and the CMYK values are the output color signal values of the output pixel signals (C', M', Y', K) created by black generator 36.

Print data transmission unit 29 reads the output image data from converted image data memory 37 when print data transmission unit 29 receives a transmission order of the print data and the device ID information for designating a printer from controller 30. Then, print data transmission unit 29 converts the output image data to a format in which the designated printer is able to read and analyze the converted data so that print data transmission unit 29 creates the print data. Print data transmission unit 29 then transmits the print data to the designated printer. A group of the above units (designation unit 24, judgment equation memory 25, profile load unit 27, profile data memory 26, color judgment converter 28, print data transmission unit 29) is controlled by printer driver 16 when the specific printer driver is selected.

Controller 30 has a temporary memory which is not shown in the drawings and is configured to control the above described units.

Referring to FIG. 2, color printer 15 is an output device connected to image processing device 10, and has a printer name "Color printer P" as the device ID information. The printer 15 functions to operate a color printing process with each of the color toners (CMYK) based on the print data received from image processing device 10.

Next, operations by image processing device 10 in the present embodiment are described. Hereinafter, explained are the operations performed by image processing device 10 with respect to a case where color printer 15 prints a color image displayed on monitor 12.

Figure 6:
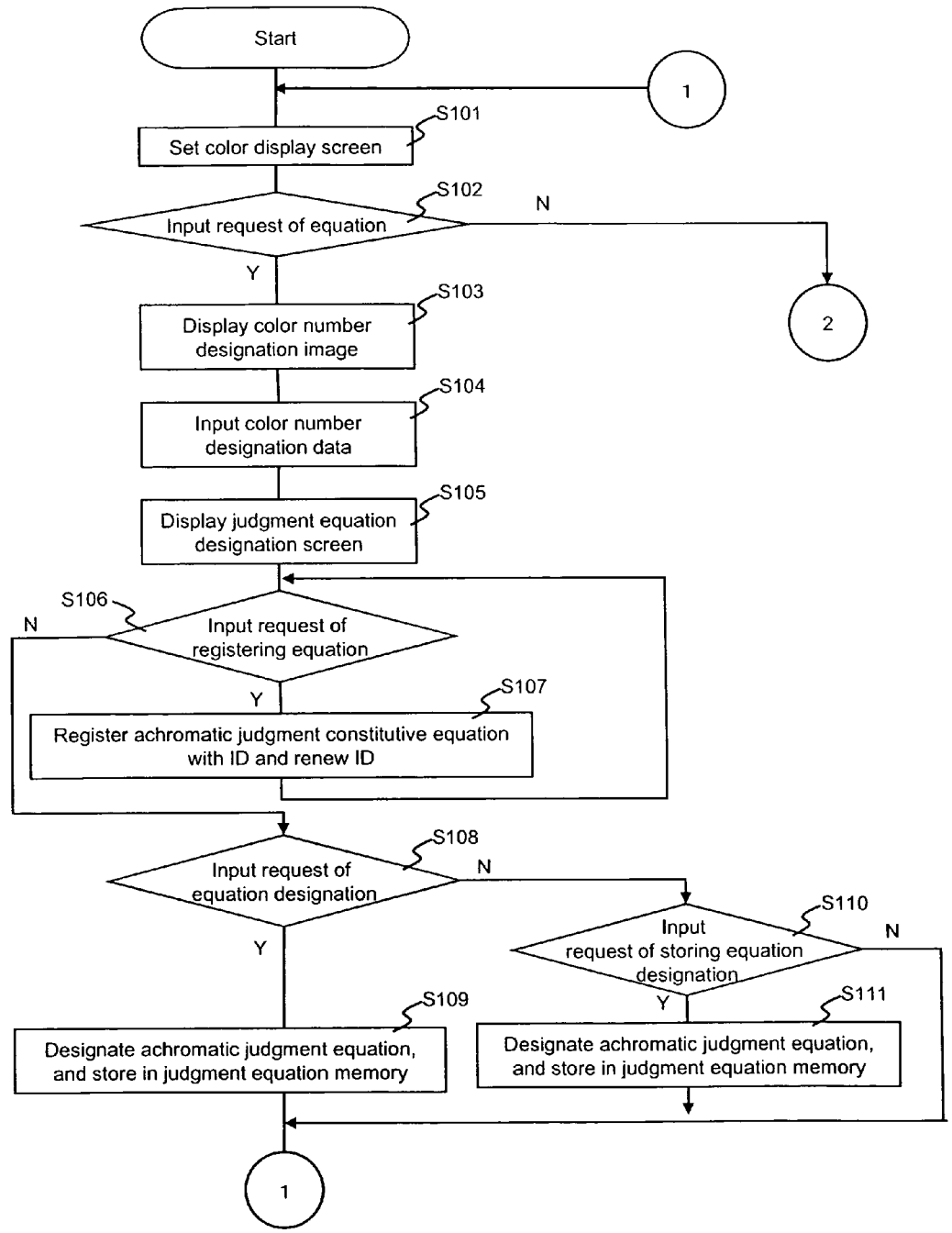
FIG. 6 is a flow diagram illustrating judgment equation setting processes of the first embodiment (part 1).
Figure 7:
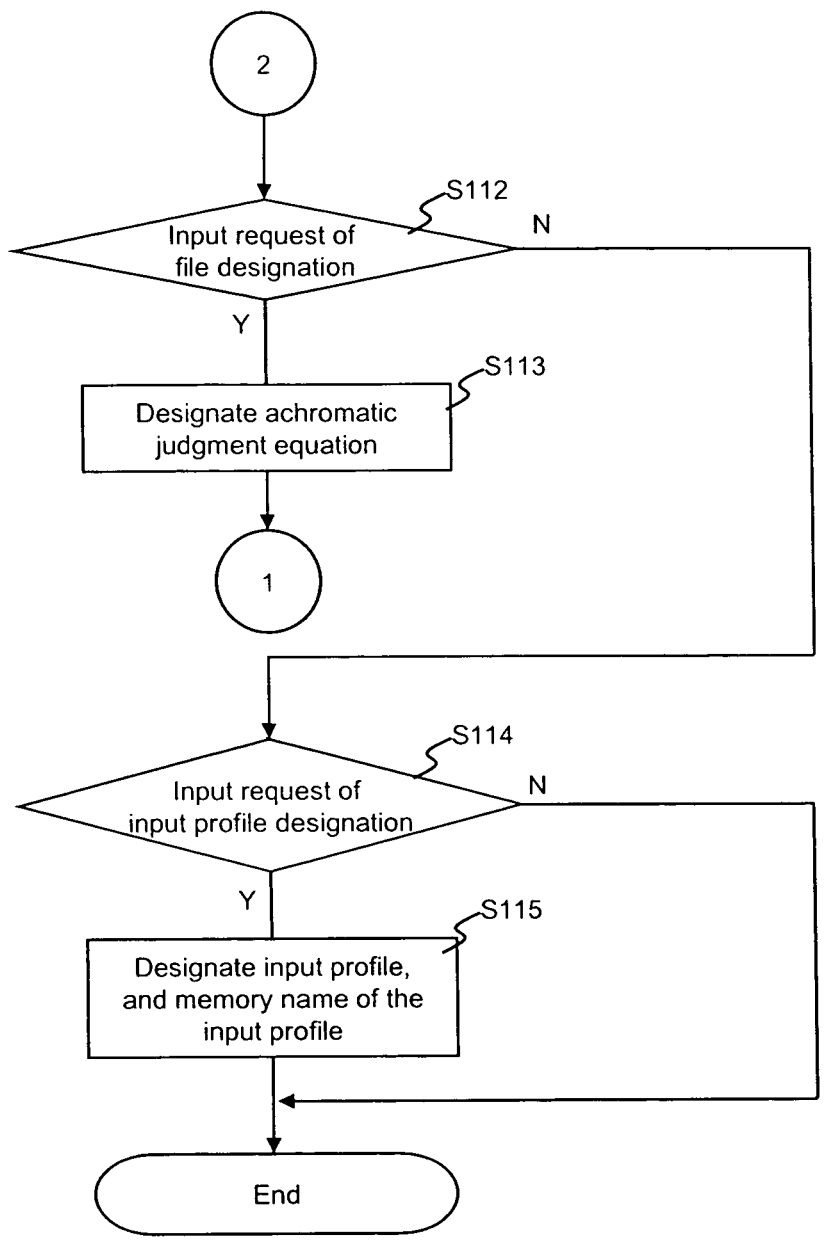
FIG. 7 is a flow diagram illustrating judgment equation setting process of the first embodiment (part 2).

Referring to FIGS. 6 and 7, the processes of the present embodiment are described, in which an input profile with respect to input color space is designated and an achromatic judgment equation is also set so that the input color space and the achromatic region in the input color space are designated.

In the following example, RGB color space is designated as the input color space. Three AJC equations, "$-1 \leq R-G \leq 1$, $-1 \leq G-B \leq 1$, $-1 \leq -R+B \leq 1$," and one CL equation, "1AND2AND3," are set. These equations are used as achromatic judgment equations in order to designate an achromatic region in the RGB color space. Additionally, the symbols R, G, B are input color signals which correspond to each of the RGB color signals. Each of the input pixel signals forming the input image data is input in a form, $(x_1, x_2, x_3) = (R, G, B)$. Additionally, each of the input color signal values $(x_1, x_2, x_3)$ is expressed with one number in the range between 0 and 255.

In image processing device 10, display 20 displays a color setting screen in order to set the input profile and the achromatic judgment equations based on the operations by controller 30 (S101).

Figure 8:
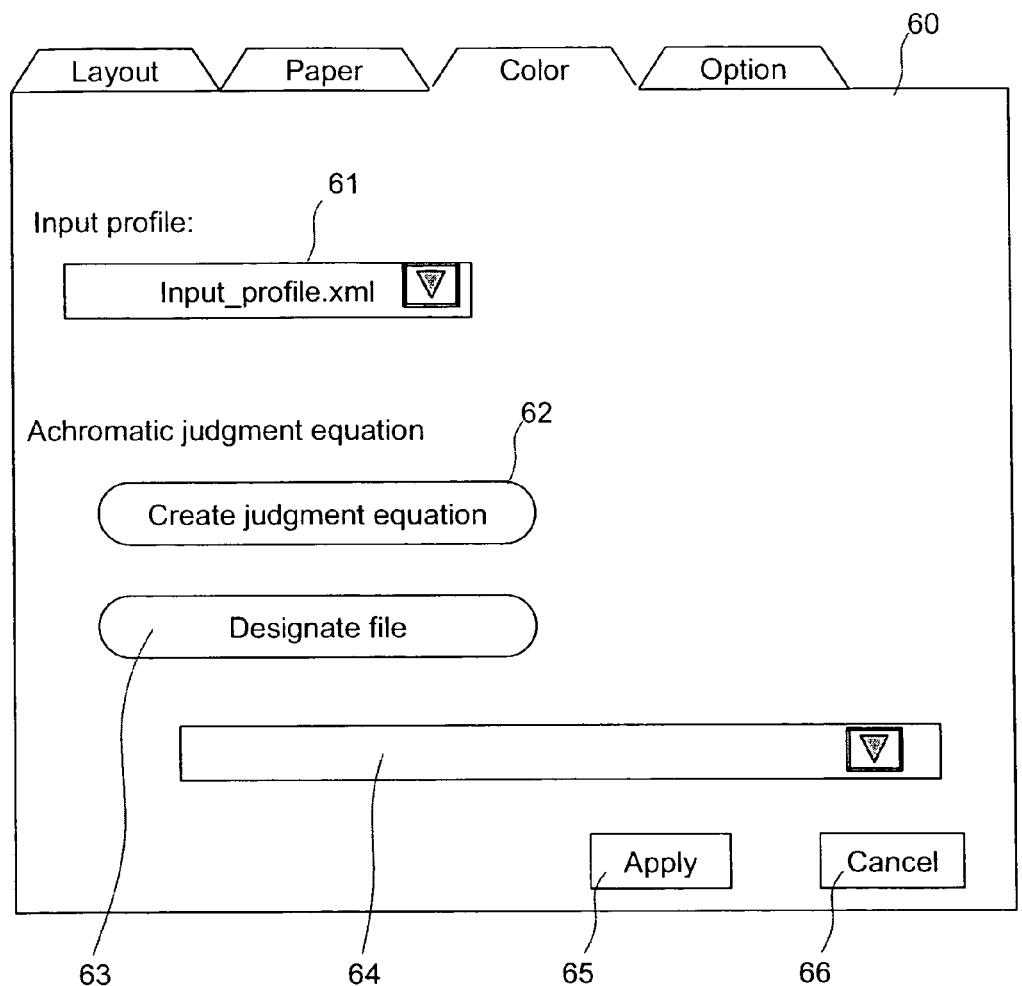
FIG. 8 is an explanatory diagram showing a configuration of the color setting screen of the first embodiment.

As shown in FIG. 8, color setting screen 60 has input profile selection region 61 for selecting an input profile. Further, color setting screen 60 has "Create judgment equation" button 62 for selecting a creating process of the achromatic judgment equation, "Designate file" button 63 for selecting a file designating process of the achromatic judgment equation, and judgment equation file selection region 64 for selecting a file name of the achromatic judgment equation which designates a file. Further, color setting screen 60 has "Apply" button 65 for executing the designating process of the selected input profile, and "Cancel" button 66 for canceling the designating process of the input profile.

In a case where the achromatic judgment equation is created and set, the user operates selection input unit 21 and clicks "Create judgment equation" button 62. According to the click, selection input unit 21 inputs a request for creating the achromatic judgment equation to controller 30 (S102).

After inputting the request of equation (S102), controller 30 operates display 20 to display color number designation screen 40 illustrated in FIG. 3 (S103).

In color number designation screen 40, in order to designate the RGB color space as the input color space, the user operates selection input unit 21, inputs a color number "3" in color number input region 41, and clicks "OK" button 42. When "OK" button 42 is clicked, selection input unit 21 inputs the color number designation data, N=3, to color number designation unit 31 via controller 30 (S104). Color number designation unit 31 informs judgment equation designation unit 32 of the input color number designation data, N=3.

Judgment equation designation unit 32 sends a display order of judgment equation designation screen 44 to controller 30 in correspondence to the informed color number designation data so that the screen 44 for designating the achromatic judgment equation is displayed on display 20. Controller 30, in correspondence with the display order, displays judgment equation designation screen 44 in display 20, which is illustrated in FIG. 4. The screen 44 shows the informed color number designation data N and three coefficient input regions 48-1, 48-2, and 48-3 which are the same amount as the informed color number designation data N (S105).

In ID number display region 45 of judgment equation designation screen 44, "1" is displayed as the ID number "i" of the AJC equation. The user operates selection input unit 21, and inputs "$-1$" as the lower limit $L_1$ in lower limit input region 46 and inputs "1" as the upper limit $H_1$ in upper limit input region 47. Also, "1," "$-1$," and "0" as weighting coefficients $a_{11}$, $a_{12}$, and $a_{13}$ are respectively input to coefficient input regions 48-1, 48-2, and 48-3. Then, the user clicks "Register" button 49 with selection input unit 21.

When "Register" button 49 is clicked, selection input unit 21 inputs an equation registration request for demanding registrations of the AJC equation, ID number "i," and input data "$L_i$, $H_i$, $a_{i1}$, $a_{i2}$, and $a_{i3}$" to controller 30 (S106). Therefore, selection input unit 21 inputs the equation registration request, ID number "i=1," and input data $L_1 = -1$, $H_1 = 1$, $a_{11} = 1$, $a_{12} = -1$ and $a_{13} = 0$ to controller 30 at (S106).

When the equation registration request is input, in correspondence with the operations of controller 30, the AJC equation "$(L_i) \leq (a_{i1}) \times x_1 + (a_{i2}) \times x_2 + (a_{i3}) \times x_3 \leq (H_i)$" with which an ID number "i" is attached is stored based on the input ID number "i" and the input data "$L_i$, $H_i$, $a_{i2}$, and $a_{i3}$" (S107). Namely, list display region 50 of judgment equation designation screen 44 additionally displays the ID number and the AJC equation, "i: $(L_i) \leq (a_{i1}) \times x_1 + (a_{i2}) \times x_2 + (a_{i3}) \times x_3 \leq (H_i)$." In FIG. 4, list display region 50 of judgment equation designation screen 44 is displaying "1: $(-1) \leq (1)x_1 + (-1) \times x_2 + (0) \times x_3 \leq (1)$." Further, the ID number "i" is incremented to "i+1." Then, ID number display region 45 of judgment equation designation screen 44 displays ID number "2" (S107).

Then, the user operates selection input unit 21 and inputs "$-1$" as the lower limit $L_2$ to lower limit input region 46, inputs "1" as the upper limit $H_2$ to upper limit input region 47, respectively inputs "0," "1," and "$-1$" as the weighting coefficients $a_{21}$, $a_{22}$, and $a_{23}$ to coefficient input regions 48-1, 48-2, and 48-3 and then clicks "Register" button 49.

When selection input unit 21 inputs the equation registration request, the ID number "i=2," and the input data "$L_2 = -1$, $H_2 = 1$, $a_{21} = 0$, $a_{22} = 1$ and $a_{23} = -1$ (S106), list display region 50 of judgment equation designation screen 44 displays "2: $(-1) \leq (0) \times x_1 + (1) \times x_2 + (-1) \times x_3 \leq (1)$" in addition to a sign corresponding to the above ID number "i=1" (S107). Further, ID number display region 45 displays "3" as the ID number "i" (S107).

Further, the user operates selection input unit 21, and inputs "$-1$" as the lower limit $L_3$ to lower limit input region 46, and inputs "1" as the upper limit $H_3$ to upper limit input region 47, further, respectively inputs "$-1$," "0," and "1" as the weighting coefficients $a_{31}$, $a_{32}$, and $a_{33}$ to coefficient input regions 48-1, 48-2, and 48-3, then clicks "Register" button 49.

When selection input unit 21 inputs the equation registration request, the ID number "i=3," and the input data "$L_3 = -1$, $H_3 = 1$, $a_{31} = -1$, $a_{32} = 0$ and $ax = 1$ (S106), list display region 50 of judgment equation designation screen 44 displays "3: $(-1) \leq (-1) \times x_1 + (0) \times x_2 + (1) \times x_3 \leq (1)$" in addition to a sign corresponding to the above ID number "i=1 and i=2" (S107). Further, ID number display region 45 displays "4" as the ID number "i" (S107).

The user operates selection input unit 21 and inputs "1AND2AND3" as the CL equation to logical equation input region 51. Then, the user clicks "OK" button 52 or "Save" button 54.

When "OK" button 52 is clicked on judgment equation designation screen 44, selection input unit 21 inputs an equation designation request in order to designate each of the AJC equations displayed in list display region 50 and the CL equation displayed in logical equation input region 51 as the achromatic judgment equation (S108). Additionally, selection input unit 21 inputs the input data related to each of the AJC equations and the CL equation to judgment equation designation unit 32 via controller 30.

Judgment equation designation unit 32 designates each of the AJC equations and the CL equation as the achromatic judgment equation in correspondence to the input equation designation request, and stores them in the temporary memory region of judgment equation memory 25 (S109).

When "Save" button 54 is clicked on judgment equation designation screen 44, selection input unit 21 inputs the equation designation storing request in order to designate each of the AJC equations displayed in list display region 50 and the CL equation displayed in logical equation input region 51 as the achromatic judgment equation and in order to store the equations (S110). Additionally, selection input unit 21 inputs the input data related to each of the AJC equations and the CL equation to judgment equation designation unit 32 via controller 30.

Judgment equation designation unit 32 designates each of the AJC equations and the CL equation as the achromatic judgment equation in correspondence to the input equation designation storing request, and creates a judgment equation file including the achromatic judgment equation. Then, judgment equation designation unit 32 supplies a file name with the judgment equation file and stores it in a file storing region in judgment equation memory 25 (S111).

When the achromatic judgment equation is designated (S111, S113), display 20 displays color setting screen 60 illustrated in FIG. 8, again (S101).

When the user designates an achromatic judgment equation, which has been stored, on color setting screen 60, the user displays an intended file name of the judgment equation file in judgment equation file selection region 64 by operating selection input unit 21, then clicks "Designate file" button 63. In correspondence with the clicking operation, selection input unit 21 inputs the file designation request for requesting a designation of the judgment equation file, and the file name data identifying the file name which is displayed in judgment equation file selection region 64 to judgment equation designation unit 32 via controller 30 (S112).

When the file designation request is input (S112), judgment equation designation unit 32, in correspondence with the input file name data, reads the judgment equation file from judgment equation memory 25, and designates the AJC equations and the CL equation stored in the judgment equation file as the achromatic judgment equation (S113).

When the achromatic judgment equation is designated (S113), display 20 displays color setting screen 60 illustrated in FIG. 8, again (S101).

Next, the user selects and displays an intended input profile in input profile selection region 61 by operating selection input unit 21 in order to designate the input profile. The input profile is, namely, a profile name of the input profile corresponding to the RGB color space. Then, the user clicks "Apply" button 65. In correspondence to the click operation, selection input unit 21 inputs the input profile designation request for requesting a designation of the input profile, and the profile name displayed in input profile selection region 61 to controller 30 (S114).

When the input profile designation request and the profile name are input, controller 30 designates the input profile and stores the profile name (S115). Accordingly, the processes of the judgment equation setting are terminated in image process device 10.

As described above, the input profile is designated and the achromatic judgment equation is set in image process device 10. The user can designate an intended color space as the input color space by adjusting the weighting coefficients of the AJC equations. Further, the user can set not only a color region which has conventionally been regarded as an achromatic region but also another region which is not included in such an achromatic region as achromatic in the input color space by adjusting the top and lower limits.

Figure 9:
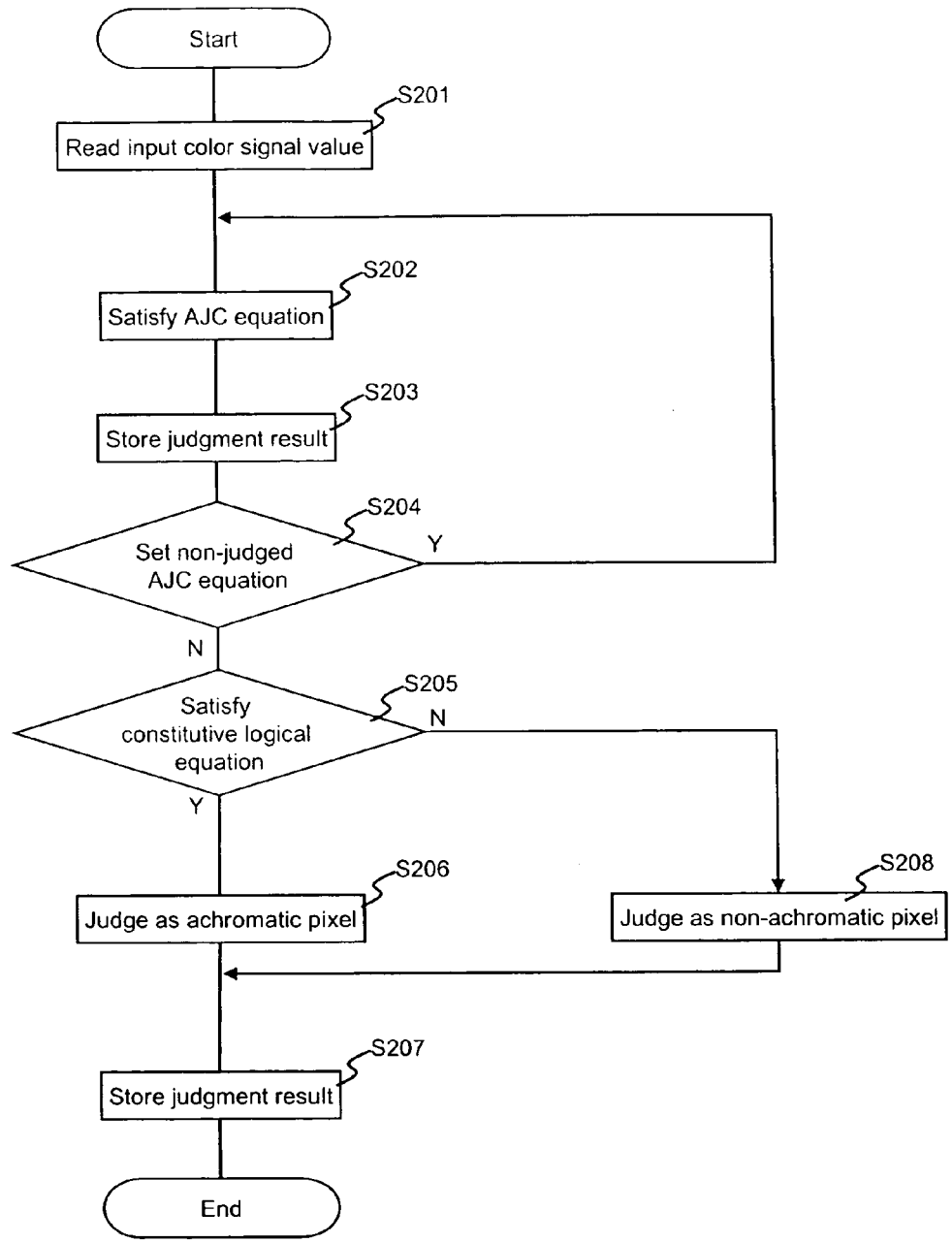
FIG. 9 is a flow diagram illustrating achromatic judgment processes of the first embodiment.

Referring to FIG. 9, with respect to each of the pixels forming the input image, operations by image process device 10 are described. In the operations, each of the pixels is judged as an achromatic pixel or not.

Herein, three AJC equations, "$-1 \leq R-G \leq 1$, $-1 \leq G-B \leq 1$, $-1 \leq -R+B \leq 1$," and one CL equation, "1AND2AND3" have already been set in the first exemplary embodiment. The following explanation refers to such an embodiment.

Input image data composed of input image signals ($R_{jk}$, $G_{jk}$, $B_{jk}$) corresponding to each of pixels (j, k) (j=1,2 . . . , k=1,2 . . . ) is input and stored in image data memory 23 of image processing device 10. Achromatic judgment unit 33 reads input color signal values $R_{jk}$, $G_{jk}$, and $B_{jk}$ corresponding to a pixel (j, k) from image data memory 23 in order to execute the achromatic judgment process with respect to the pixel (S201). Achromatic judgment unit 33, for example, reads input color signal values, $R_{jk}$=100, $G_{jk}$=100, $B_{jk}$=101 corresponding to the input image signals ($R_{jk}$, $G_{jk}$, $B_{jk}$)=(100, 100, 101) (S201).

Next, achromatic judgment unit 33 reads an AJC equation, "$-1 \leq R-G \leq 1$," corresponding to an ID number "i=1" from judgment equation memory 25, and judges whether or not the input color signal values $R_{jk}$, $G_{jk}$, and $B_{jk}$ satisfy the AJC equation. In the embodiment, the "$R_{jk}-G_{jk}$" equals "100−100=0." Accordingly, achromatic judgment unit 33 decides that the pixel (j, k) satisfies the AJC equation corresponding to the ID number "i=1" (S202).

Then, achromatic judgment unit 33 stores the judgment result in judgment result memory 34 (S203). In judgment result memory 34, the judgment result "1" is stored (S203). The judgment result corresponds to the positional data (j, k) of the judgment target pixel and the ID number "i=1" of the AJC equation. At S202, in a case where the pixel is decided not to meet the AJC equation with the ID number "i=1," judgment result memory 34 stores the judgment result "0" which corresponds to the positional data (j, k) and the ID number "i=1" (S203).

Also, achromatic judgment unit 33 decides whether or not an AJC equation corresponding to the ID number "i=2" is set in judgment equation memory 25 (S204). In a case where achromatic judgment unit 33 decides that there is the AJC equation, achromatic judgment unit 33 reads the AJC equation, "$-1 \leq G-B \leq 1$," and judges whether or not the input color signal values $R_{jk}$, $G_{jk}$, and $B_{jk}$ satisfy the AJC equation. Herein, since the "$G_{jk}-B_{jk}$" equals "100−101=−1," achromatic judgment unit 33 judges the pixel (j, k) satisfies the AJC equation corresponding to the ID number, "i=2" S202).

Next, achromatic judgment unit 33 stores the judgment result in judgment result memory 34 (S203). Judgment result memory 34 stores the judgment result "1" which corresponds to the positional data (j, k) of the judgment target pixel and the ID number "i=2" of the AJC equation (S203).

Also, achromatic judgment unit 33 decides whether or not an AJC equation (a non-judged AJC equation) corresponding to the ID number "i=3" is set in judgment equation memory 25 (S204). In a case of deciding that such an equation is set, achromatic judgment unit 33 reads the AJC equation "$-1 \leq -R+B \leq 1$" and judges whether or not the input color signals $R_{jk}$, $G_{jk}$, and $B_{jk}$ satisfy the AJC equation. In a case of "$-R_{jk}+B_{jk}$=−100+101=1," achromatic judgment unit 33 judges that the pixel (j, k) satisfies the AJC equation corresponding to the ID number "i=3" (S202).

Achromatic judgment unit 33 stores the judgment result in judgment result memory 34 (S203). Judgment result memory 34 stores the judgment result "1" which corresponds to the positional data (j, k) of the judgment target pixel and ID number "i=3" of the AJC equation (S203).

Next, achromatic judgment unit 33 decides whether or not an AJC equation corresponding to the identification number i=4 is set in the judging equation memory 25 (S204). As the AJC equations of the ID number "i=1~3" are set and the AJC equations of the ID number "i=1~4" are not set in the judgment equation memory 25, achromatic judgment unit 33 decides that the equation is not set (S204).

When it is decided that the non-judged AJC equation does not exist (S204), achromatic judgment unit 33 reads the CL equation from judgment equation memory 25. Then, corresponding to the pixels (j, k) for judging, achromatic judgment unit 33 judges whether or not each of the judgment results satisfies the CL equation that is stored in judgment result memory 34 (S205). As the judged results that are stored in judgment result memory 34 are all set as "1" with respect to the ID numbers "i=1~3," achromatic judgment unit 33 judges that the input color signal values corresponding to the pixel (j, k) satisfy the CL equation of "1AND2AND3" (S205).

Based on this result, achromatic judgment unit 33 judges that the pixel (j, k) is the achromatic pixel (S206). Then, achromatic judgment unit 33 causes judgment result memory 34 to store the judgment result that the pixel is an achromatic pixel (S207). Subsequently, the achromatic judgment processes are completed.

As described above, based on the input color signal values of each pixel and the achromatic judgment equation that is set in response to the user's designation, it is judged whether or not the pixel is an achromatic pixel. The judgment result is stored in judgment result memory 34.

Moreover, at S205, when either one of the judgment results is "0," achromatic judgment unit 33 judges that the input color signal values corresponds to the pixel do not satisfy the CL equation "1AND2AND3". Based on the result, the unit 33 judges that the pixel is not an achromatic pixel (S208), and causes judgment result memory 34 to store the judgment result (S207).

Figure 10:
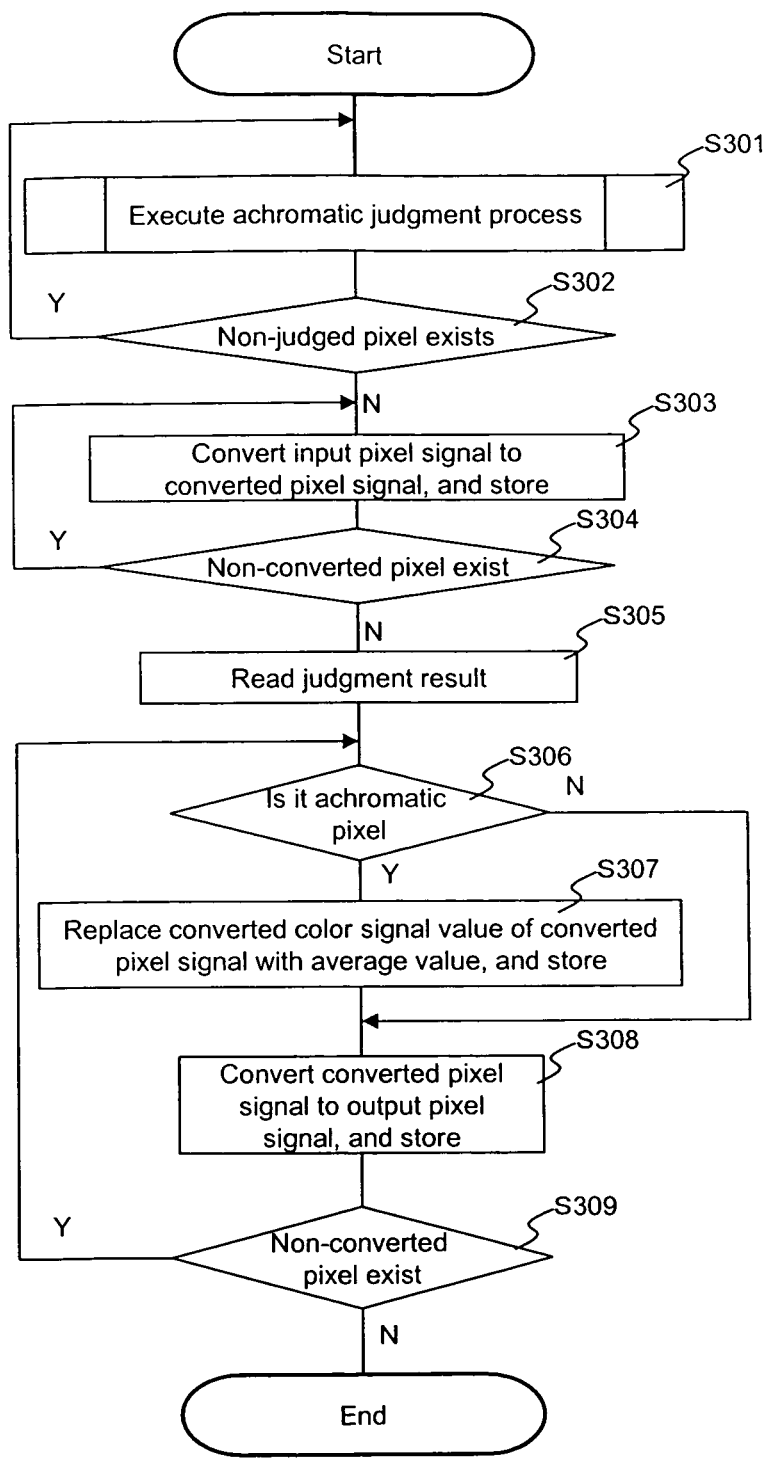
FIG. 10 is a flow diagram illustrating color convert processes of the first embodiment.

Subsequently, at image processing device 10, a flow of processes is explained with reference to FIG. 10. In the processes, color conversion from each input pixel signal of the input image data into an output pixel signal is performed.

The following describes an example of executing color converting processes from RGB color signals into CMYK color signals.

Concerning image processing device 10, each of input pixel signals ($R_{jk}$, $G_{jk}$, $B_{jk}$) is stored in image data memory 23 as input image data corresponding to all of the pixels that structure the input image being displayed at monitor 12. When controller 30 sends a color converting order to color judgment converter 28 to color convert this input image data, achromatic judgment unit 33 reads the input color signal values $R_{jk}$, $G_{jk}$ and $B_{jk}$ that correspond to each pixel (j, k) along with the main scanning direction (j=1, 2 . . . ) and sub scanning direction (k=1, 2 . . . ) in turn from image data memory 23, and executes the achromatic judgment processes based on the input color signal values and the achromatic judgment equation explained with reference to FIG. 9 (S301). The judgment result with respect to each pixel is stored in judgment result memory 34 (S301).

When a non judged pixel exists (S302), achromatic judgment unit 33 executes the achromatic judgment processes with respect to the pixel (S301). Then, when the achromatic judgment processes with respect to all of the pixels are completed (S301), color converter 35 converts the RGB values of the input pixel signals ($R_{jk}$, $G_{jk}$, $B_{jk}$) into the CMY values with respect to each of the pixels (j, k) and creates the converted pixel signals ($C_{jk}$, $M_{jk}$, $Y_{jk}$) (S303). Color converter 35 refers to the look-up table that is created by profile load unit 27, and converts the input pixel signal to the converted pixel signals (S303). Each of the created converted pixel signals is stored as the converted image data in converted image data memory 37 (S303).

When the converting processes, from the input pixel signals ($R_{jk}$, $G_{jk}$, $B_{jk}$) to the converted pixel signals ($C_{jk}$, $M_{jk}$, $Y_{jk}$), with respect to all of the pixels are completed, black generator 36 performs following processes with respect to each of the pixels (j, k) in order to convert the CMY values of the converted pixel signals ($C_{jk}$, $M_{jk}$, $Y_{jk}$) into the CMYK values.

First of all, black generator 36 reads the judgment result that is stored in judgment result memory 34 (S305). Then, black generator 36 decides whether or not the pixel (j, k) is the achromatic pixel based on the read judgment result (S306).

When the pixel (j, k) is decided as the achromatic pixel (S306), black generator 36 reads the CMY values of the converted pixel signal ($C_{jk}$, $M_{jk}$, $Y_{jk}$) that correspond to the pixel (j, k), and calculates the average value of $A_{jk}=(C_{jk}+M_{jk}+Y_{jk})/3$. Then, black generator 36 replaces the CMY value of the converted pixel signal with the calculated average value, and overwrites the converted pixel signal to ($A_{jk}$, $A_{jk}$, $A_{jk}$) (S307).

When the pixel (j, k) is decided as the non-achromatic pixel, or chromatic pixel (S306), black generator 36 skips the replacing processes (S307) of the CMY values with respect to the pixel.

Moreover, black generator 36 converts the CMY values of the converted pixel signal ($C_{jk}$, $M_{jk}$, $Y_{jk}$) that correspond to the pixel (j, k) into the CMYK values, and creates the output pixel signal ($C'_{jk}$, $M'_{jk}$, $Y'_{jk}$, $K_{jk}$) (S308). The conversion from the converted pixel signal to the output pixel signal is performed as described below.

Black generator 36 selects the minimum value min ($C_{jk}$, $M_{jk}$, $Y_{jk}$) from the CMY values $C_{jk}$, $M_{jk}$, $Y_{jk}$ of the converted pixel signal, and performs the conversion of the CMY values based on the differences between each of the CMY values and this minimum values. In short, the CMY values of the output pixel signal are calculated as $C'_{jk}=C_{jk}-\min(C_{jk}, M_{jk}, Y_{jk})$, $Y'_{jk}=Y_{jk}-\min(C_{jk}, M_{jk}, Y_{jk})$, $M'_{jk}=M_{jk}-\min(C_{jk}, M_{jk}, Y_{jk})$ (S308). More specifically, each minimum value is calculated by the following:

$$\min(C_{jk})=C_{jk}(C_{jk} \leq M_{jk} \text{ AND } C_{jk} \leq Y_{jk})$$

$$\min(M_{jk})=M_{jk}(M_{jk} \leq C_{jk} \text{ AND } M_{jk} \leq Y_{jk})$$

$$\min(Y_{jk})=Y_{jk}(Y_{jk} \leq C_{jk} \text{ AND } Y_{jk} \leq Y_{jk}).$$

Black generator 36 multiplies predetermined weighting coefficients a to this minimum values, and calculates the value K as $K_{jk}=\alpha \times \min(C_{jk}, M_{jk}, Y_{jk})$ (S308). The output image data which is comprised of each of the output pixel signals ($C'_{jk}$, $M'_{jk}$, $Y'_{jk}$, $K_{jk}$) that are created with the above-mentioned calculations is stored in converted image data memory 37 (S308).

When the converting processes of the output pixel signal ($C'_{jk}$, $M'_{jk}$, $Y'_{jk}$, $K_{jk}$) with respect to all of the pixels are completed, namely where a non-converted pixel does not exist (S309), the color converting processes at image processing device 10 are terminated.

As mentioned above, the input pixel signals ($R_{jk}$, $G_{jk}$, $B_{jk}$) are converted into the output pixel signals ($C'_{jk}$, $M'_{jk}$, $Y'_{jk}$, $K_{jk}$), the input image data in the input color space is chromatically converted into the output image data of the output color space. By executing these color converting processes, after the input pixel signals ($R_{jk}$, $G_{jk}$, $B_{jk}$) corresponding to the pixels (j, k) that are judged as achromatic pixels based on the achromatic judgment equation are converted into the converted pixel signals ($A_{jk}$, $A_{jk}$, $A_{jk}$) that are comprised of CMY values, those are converted into the output pixel signals (0, 0, 0, $K_{jk}$), then are output as the achromatic signals. Moreover, after the pixels that are judged as the chromatic pixels are converted into the converted pixel signals ($C_{jk}$, $M_{jk}$, $Y_{jk}$) that are comprised of the CMY values, the overlapping parts of the CMY values are converted into the K values. Accordingly, the occurrence of ink smudges caused by the over-layering of CMY toners is controlled/prevented. Therefore, the reproduction of achromatic colors of the printing result using the color printer 15 is improved.

The output pixel signals are calculated by the following two steps:

(1) Obtaining average values ($A_{jk}$):

$$A_{jk}=(C_{jk}+M_{jk}+Y_{jk})/3 \text{ (``3'' is the number of primary colors)}$$

Accordingly, the converted pixel signal is ($A_{jk}$, $A_{jk}$, $A_{jk}$).

(2) Converting to output pixel signal ($C'_{jk}$, $M'_{jk}$, $Y'_{jk}$, $K_{jk}$):

$$C'_{jk}=A_{jk}-\min(A_{jk}, A_{jk}, A_{jk})=0$$

$$M'_{jk}=A_{jk}-\min(A_{jk}, A_{jk}, A_{jk})=0$$

$$Y'_{jk}=A_{jk}-\min(A_{jk}, A_{jk}, A_{jk})=0$$

$$K_{jk}=\alpha \times \min(A_{jk}, A_{jk}, A_{jk})=\alpha \times A_{jk}, \text{ or } K_{jk}=\alpha \times (C_{jk}+M_{jk}+Y_{jk})/3$$

Accordingly, the output pixel signal ($C'_{jk}$, $M'_{jk}$, $Y'_{jk}$, $K_{jk}$) is (0, 0, 0, $K_{jk}$), and such a pixel signal is defined as a signal including only an achromatic signal value.

A flow of the processes of outputting the print data according to the present exemplary embodiment will be explained using a flow diagram shown in FIG. 11. The processes are conducted by inputting and by chromatically converting the image data of the color image that is displayed on monitor 12 at image processing device 10.

When the user operates selection input unit 21 to request a printing of the color image while the color image is displayed on monitor 12, the print request is input from selection input unit 21 to controller 30 at image processing device 10 (S401).

When this print request is received, controller 30 controls display 20 and displays the printer designation screen in order to designate a printer to use for printing process (S402).

Figure 11:
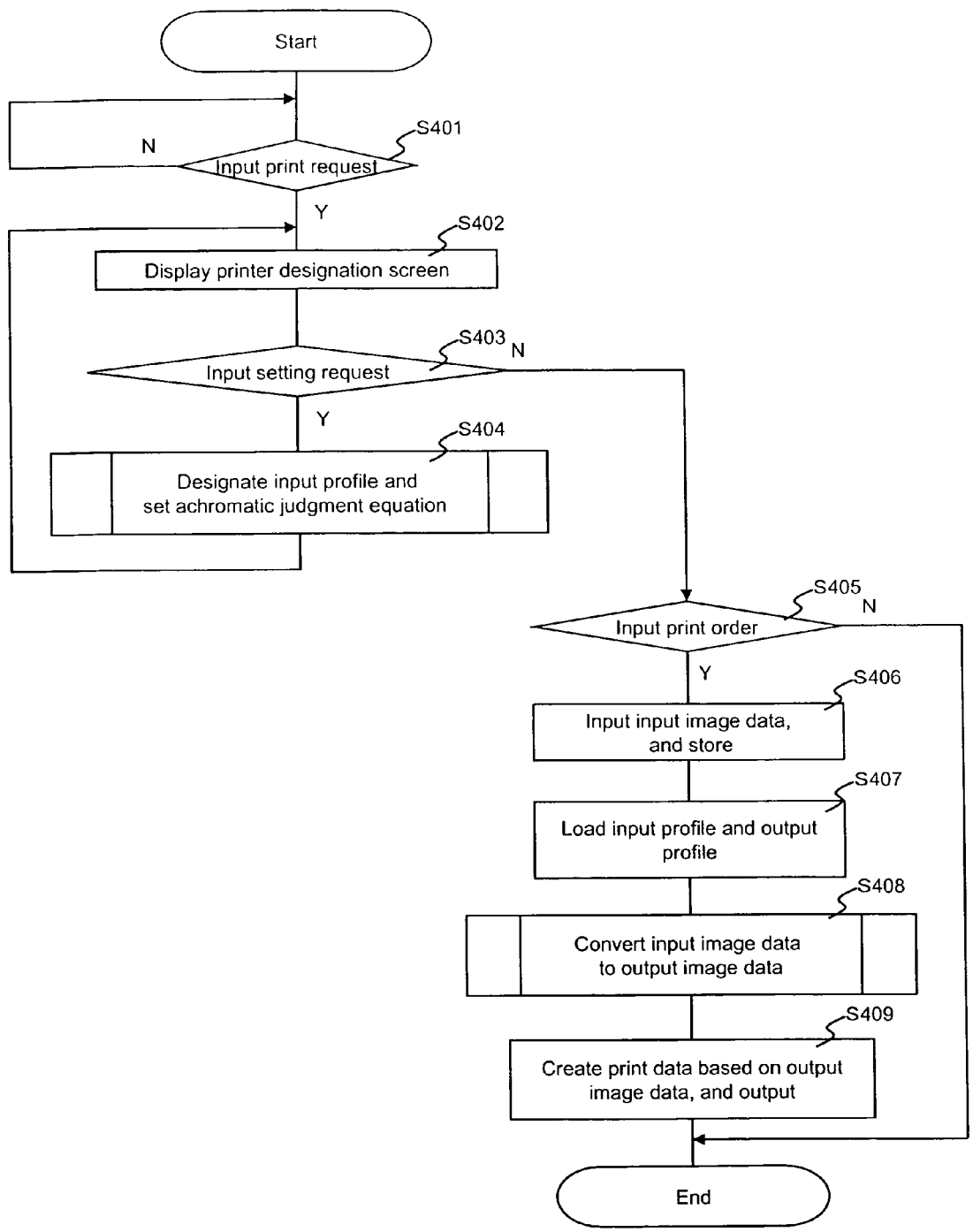
FIG. 11 is a flow diagram illustrating conversion output processes of the first embodiment.
Figure 12:
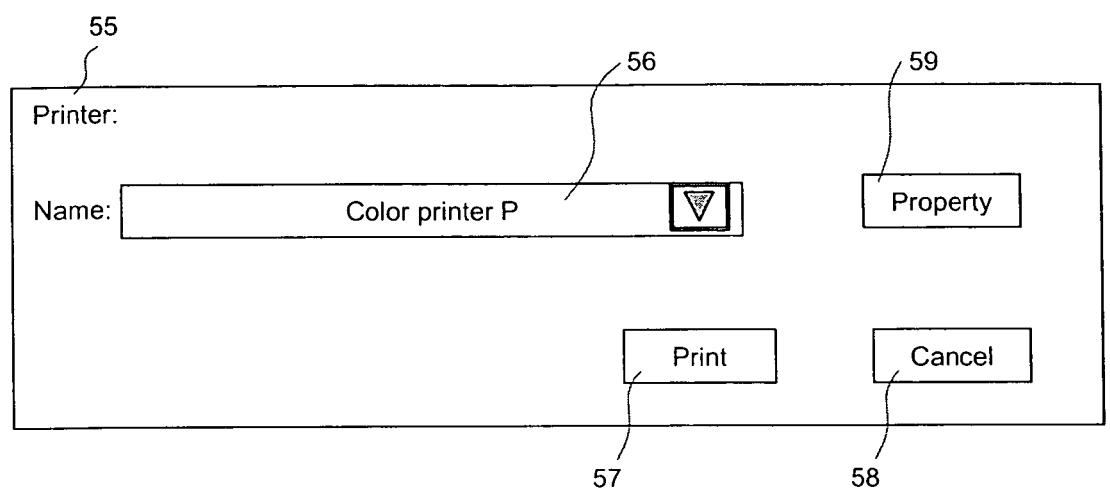
FIG. 12 is an explanatory diagram showing a structure of a printer designation screen of the first embodiment.

Referring to FIGS. 11 and 12, printer designation screen 55 includes printer selection region 56 to select a printer used for the printing processes, "Print" button 57 to select an execution for the printing processes and "Cancel" button 58 to select a cancel execution of the printing processes. Moreover, "Property" button 59 to select a setting of the print condition is displayed on printer designation screen 55.

A user operates selection input unit 21 and displays a desired printer name of the printer on printer selection region 56. Here, the user displays the printer name "Color printer P" corresponding to color printer 15 on printer selection region 56. Moreover, the "Property" button 59 is clicked in order to set the desired print condition by operating selection input unit 21.

When "Property" button 59 is clicked, selection input unit 32 inputs the setting request to request the print condition setting and the printer name "Color printer P" as device ID information that is displayed on printer selection region 56 in controller 30 (S403).

When the setting request is input (S403), controller 30 displays the print condition setting screen to set a print condition at the selected printer on display 20 based on the input device ID information. At this print condition setting screen, the user can set and designate a desired printing layout, a type of printing media or the like. As previously described, the user performs a predetermined operation in order to designate the input profile and set the achromatic judging equation, and displays color setting screen 60 on display 20 (FIG. 8). Then, image processing device 10 executes the judging equation setting process to set the achromatic judging equation in the order explained in FIGS. 6 and 7 (S404).

When the achromatic judging equation is set, and the input profile is designated (S404), the display 20 displays printer designation screen 55 (FIG. 12) again, based on the control of controller 30 (S402). At printer designation screen 55, when "Print" button 57 is clicked, selecting input part 21 inputs a print order that orders print execution as well as inputs printer name "Color printer P" that is displayed at printer selection region 56 (S405).

When the printing order is input (S405), based on the control of controller 30, the image data input unit 22 inputs the image data of the input image, or in other words, inputs the input image data as an input image of the color image that is displayed on monitor 12, then stores it in image data memory 23 (S406).

Next, controller 30 notifies the profile name that is designated at S404 and the device ID information, "Color printer P," that is input at printer designation screen 55 to profile load unit 27. Then, profile load unit 27 reads and then loads the profile data corresponding to the profile name as the input profile, and the profile data corresponding to the device ID information as the output profile from profile data memory 26, and creates a look-up table (S407).

Next, controller 30 sends a color converting order to color judgment converter 28 in order to color-convert the input image data into the output image data. Then, the color converting processes of color judgment converter 28 are executed in an order that is explained in FIG. 10 (S408). Each of the input pixel signals (R, G, B) of the input image data is color converted into an output pixel signal (C, M, Y, K), and the output image data is stored in converted image data memory 37 (S408).

Next, controller 30 sends the transmission order of the print data and the device ID information "Color printer P" to print data transmission unit 29. Then, print data transmission unit 29 reads the output image data from converted image data memory 37, converts the output image data into a format corresponds to color printer 15, and creates the print data (S409). The created print data is sent to color printer 15 from print data transmission unit 29 (S409). As a result, the converting output processes of the image data at image processing device 10 are completed.

As mentioned above, after the image data of the color image that is displayed on monitor 12 is input and color converted into the output image data, the print data corresponding to the designated color printer 15 is output and transmitted to color printer 15. As described above, the processes are a part of the functions of the printer driver installed in a personal computer, and are a convert designation process for the color convert processes executed inside the printer driver. The process is to be initiated when, for example, a print order is sent, or when a property of the printer driver is selected.

As mentioned above, in image processing device 10, as the input profile and the achromatic judging equation are set based on the user's designation, setting change of the input color space and the achromatic region of the input color space becomes possible as well as freely changing the achromatic judging equation. Accordingly, as the setting of the achromatic judging equation can be changed by adjusting the setting of upper (maximum) and lower (minimum) values of the achromatic judging equation, the user's personal preference can be reflected upon the color reproduction result using the output device. Moreover, as the achromatic region can be designated using the achromatic judging equation, the execution of the achromatic judging using less memory can be achieved compared to when the achromatic judging is performed by registering all of the achromatic signal values.

Second Embodiment

Figure 13:
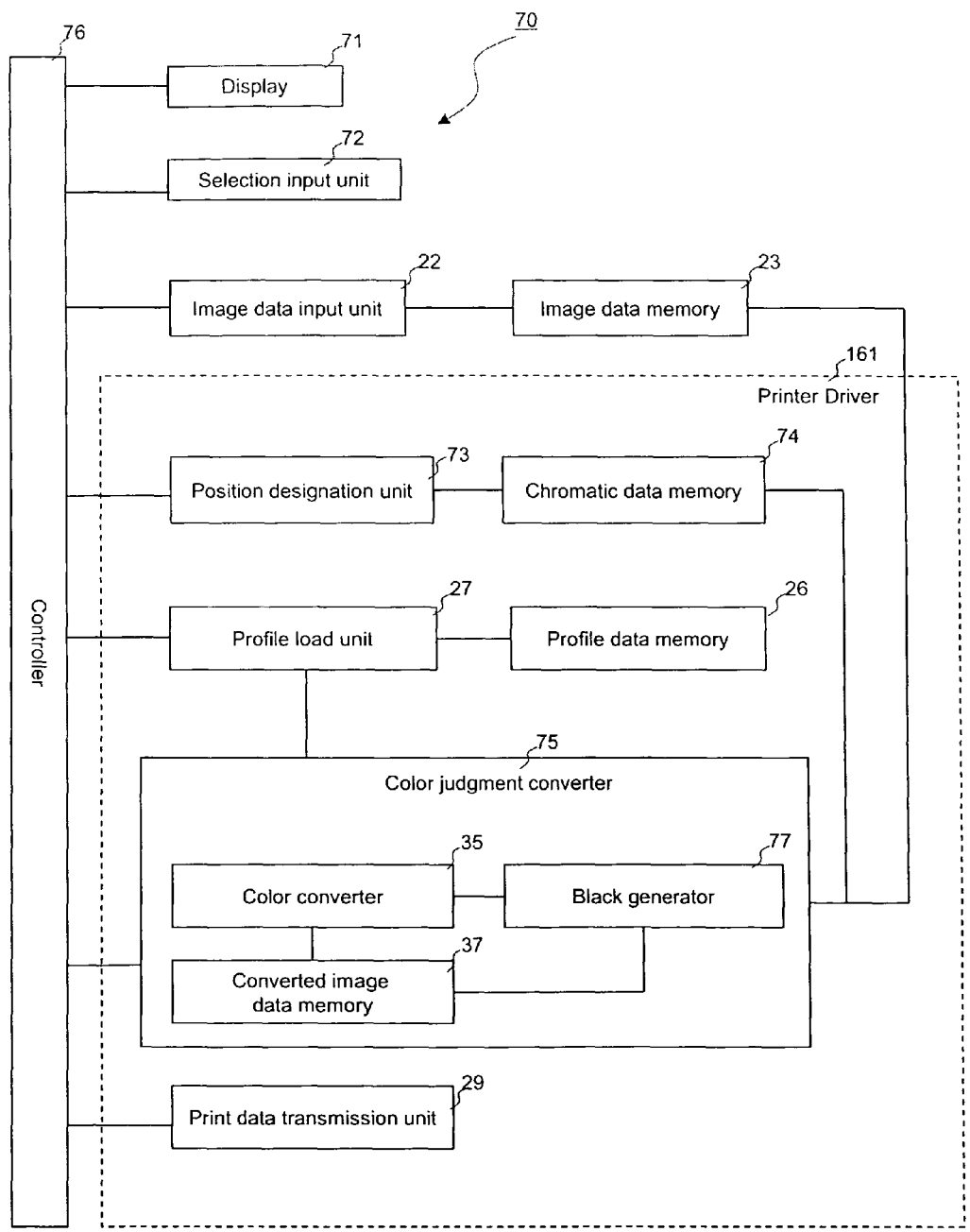
FIG. 13 is a block diagram describing functional configurations of the image processing device related to a second exemplary embodiment.

Referring to FIG. 13, image processing device 70 of the present embodiment differs from the first exemplary embodiment because of position designation unit 73 for designating a position of achromatic pixels and chromatic data memory part 74 for memorizing chromatic data in printer driver 161. Moreover, the same reference numbers as the first embodiment are used for similar parts, and explanations of the parts similar to those of the first embodiment are omitted.

As shown in FIG. 13, image processing device 70 of the present embodiment comprising display 71, selection input unit 72, image data input unit 22, image data memory 23, position designation unit 73, chromatic data memory 74, profile data memory 26, profile load unit 27, color judgment converter 75, print data transmission unit 29 and controller 76. Specifically, when specific printer driver 161 is installed and the property of printer driver 161 is selected, it controls position designation unit 73, chromatic data memory 74, profile data memory 26, profile load unit 27, color judgment converter 75, and print data transmission unit 29 for performing the following processes.

Display 71 includes monitor 12 (FIG. 2) as a display device, and displays color images, also displays various kinds of user interface screens of position designation screen or the like to designate positions of the achromatic pixels. Selection input unit 72 includes mouse 13 and keyboard 14 (FIG. 2), for inputting various kinds of input information and selected information such as the position designation data for designating positions of the achromatic pixels.

Figure 14:
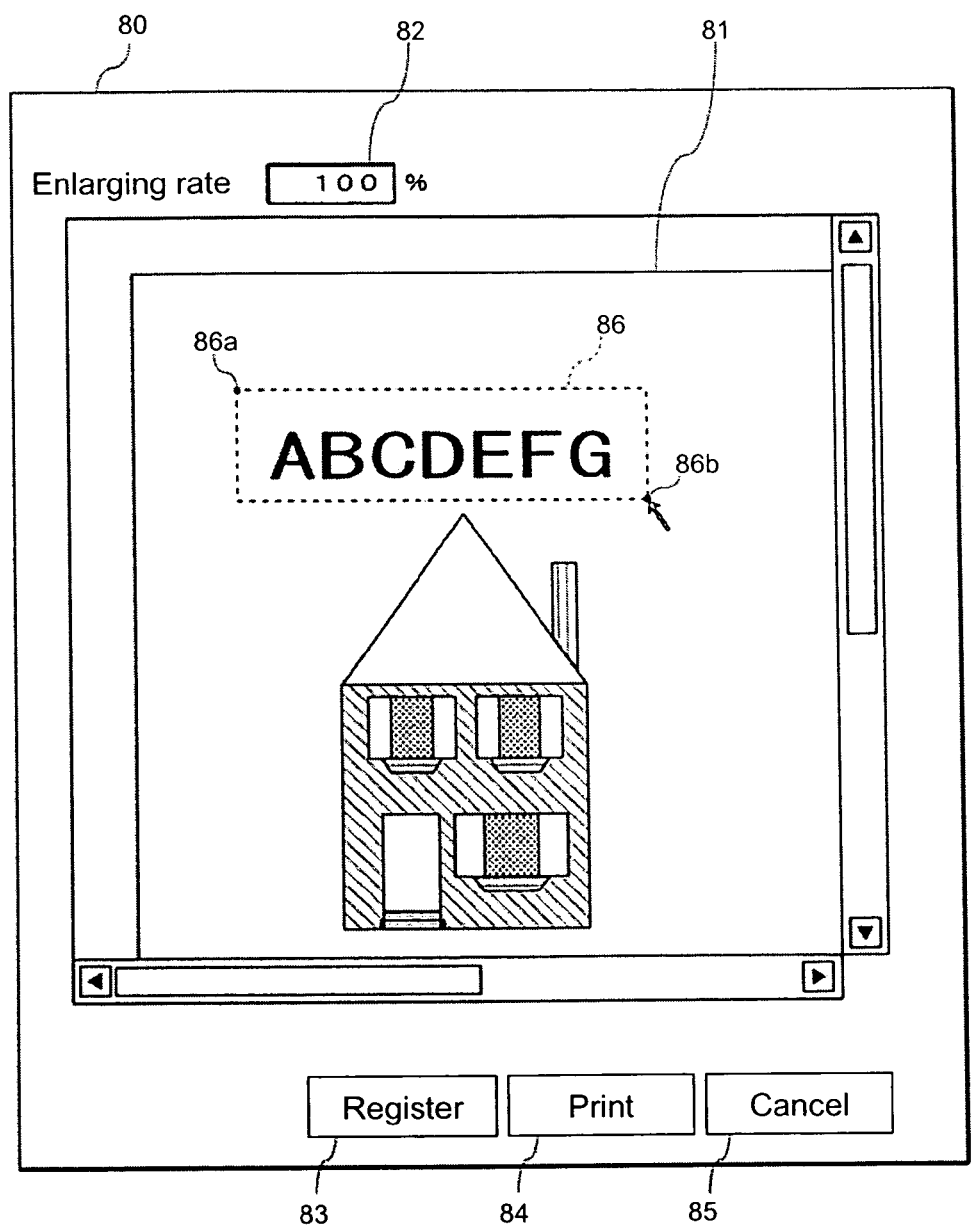
FIG. 14 is an explanatory diagram showing a structure of a position designation screen of the second embodiment.

As shown FIG. 14, position designation screen 80 has input image display region 81 to display color images as input images. Moreover, at position designation screen 80, enlarging ratio input region 82 for inputting the enlarging ratio data indicating the enlarging ratio of the input images that are displayed on input image display region 81. Moreover, at position designation screen 80, "Register" button 83 is for designating a position of the achromatic pixels and registering the position, "Print" button 84 is for ending the position designation of the achromatic pixels and for starting a printing process, and "Cancel" button 85 is for canceling the position designation of the achromatic pixels.

At the position designation screen 80, the user operates mouse 13, and for example, as shown in FIG. 14, selects a rectangular shaped closed area as achromatic part 86 with respect to the input image displayed in input image display region 81. Then, when the "Register" button 83 is clicked while achromatic part 86 is being selected, selection input unit 72 inputs the selected area data that shows the position area of the selected achromatic part 86. In the present embodiment, selection input unit 72, as the selected area data, inputs the positional data $(j_a, k_a)$ positioned at the upper left corner 86a of the achromatic part 86 and the positional data $(j_b, k_b)$ of the pixels that are positioned at the right bottom corner 86b.

Position designation unit 73 has a function to designate the positions of the achromatic pixels with respect to the input image based on the selected area data. Chromatic data memory 74 is composed of a volatile memory, and a memory region which functions, in correspondence with the designations by position designation unit 73, to store the chromatic data indicating whether or not each of pixels forming the input image is an achromatic pixel.

Position designation unit 73, when the total number of pixels of the input image is $N_j \times N_k$, reserves a required amount the memory region of $N_j \times N_k$ bytes as chromatic data registration memory in chromatic data memory 74. Here, $N_j$ shows the number of pixels of the main scanning direction of the input image data, and $N_k$ shows the number of pixels of the sub scanning direction.

Moreover, position designation unit 73 registers chromatic data that corresponds to each pixel in the reserved chromatic data registration memory. The registration of chromatic data of each pixel for the chromatic data registration memory performed by position designation unit 73 is executed by storing data "1" or data "0" in the address portion that corresponds to each pixel. Here, the data "1" is chromatic data showing that the pixel is an achromatic pixel, and the data "0" is chromatic data showing that the pixel is not an achromatic pixel. For example, when the beginning of address of the chromatic data registration memory at chromatic data memory 74 is ADR1, position designation unit 73 registers the chromatic data of the pixels (j, k) of the input image into a region of chromatic data memory 74 ranging from ADR1 to $(k-1) \times N_j + j$ bytes by attaching data "1" or "0."

Color judgment converter 75, as shown in FIG. 13, has color converter 35, black generator 77 and converted image data memory 37.

Black generator 77 has a function to create achromatic signal value K which corresponds to each pixel, and converts the converted pixel signals (C, M, Y) to the output pixel signals (C', M', Y', K).

Black generator 77 reads chromatic data which corresponds to the subject pixels (j, k) from the chromatic data registered memory of chromatic data memory 74, and converts from CMY values to CMYK values based on the chromatic data. The detailed explanation of the flow of the converting processes of CMY values to CMYK values using black generator 77 is omitted as it is same as the first exemplary embodiment.

Controller 76 has a temporal memory unit which is not shown in the figures, and has a function to control each part of image processing device 70.

Figure 15:
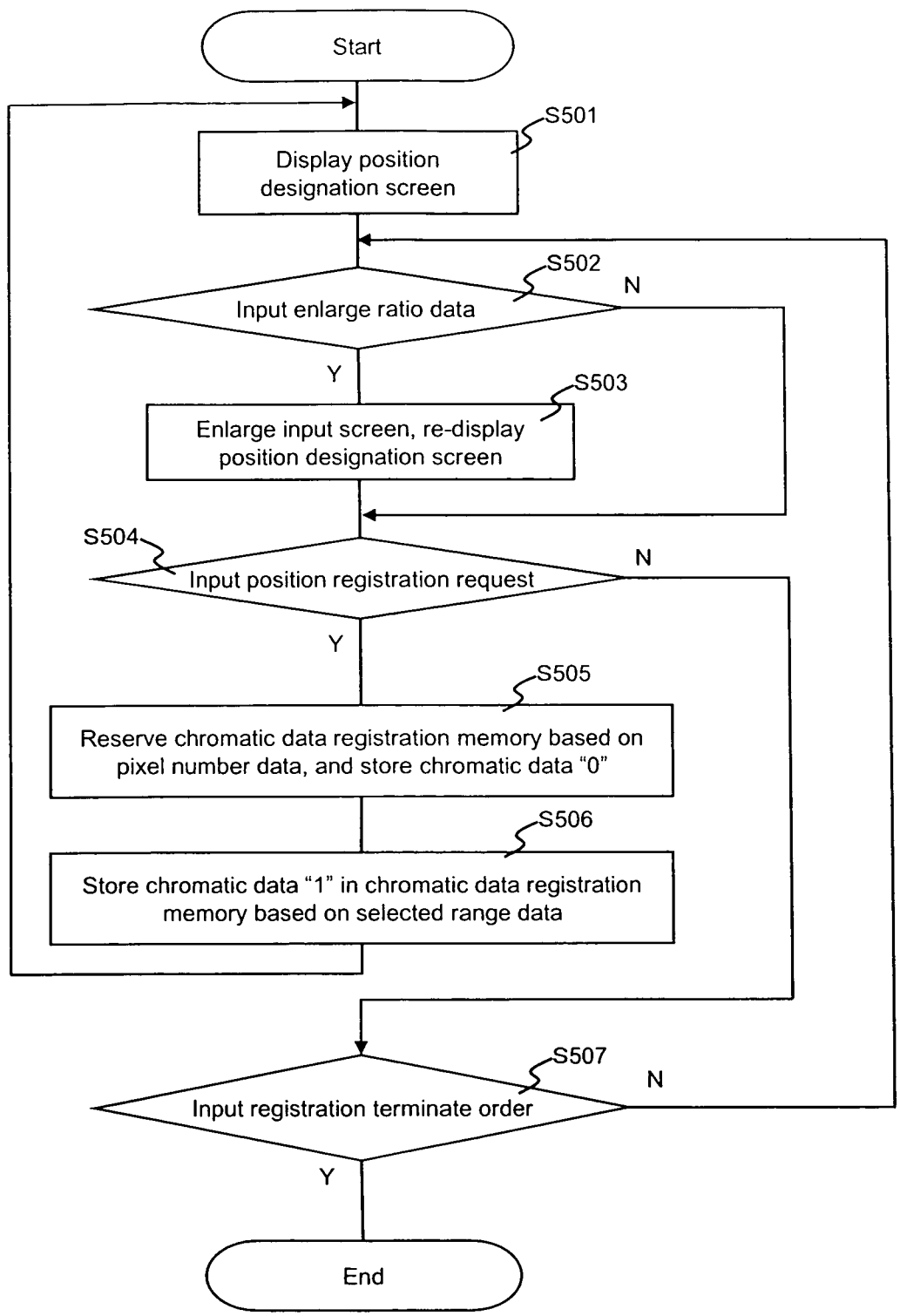
FIG. 15 is a flow diagram illustrating chromatic data registration processes of the second embodiment.

Referring to FIG. 15, operation of image processing device 70 of the present embodiment is now explained. First of all, at image processing device 70, a flow of processes when the positions of the achromatic pixels are designated and the chromatic data for each pixel is registered, will be explained.

Here, a flow of the processes when the pixels of the characters are designated as achromatic pixels of the input image that is shown in FIG. 14 is explained.

At image processing device 70, display 71 displays a position designation screen 80 (FIG. 14) in order to designate the positions of the achromatic pixels based on the control of controller 76 (S501).

At position designation screen 80, on input image display region 81, as shown in FIG. 14, the input image is displayed based on the input image data that is stored in image data memory 23. When the user desires to enlarge the display of the input image, the desired enlarging ratio data is input in enlarging ratio input region 82 by operating selection input unit 72.

At the position designation screen 80, when the enlarging ratio data is input (S502), display 71 enlarges the display of the input image on input image display region 81 based on the input enlarging ratio data, and re-displays position designation screen 80 (S503).

When designating the characteristic portions as achromatic pixels, the user operates selection input unit 72, and clicks the "Register" button 83 after selecting the area including characteristic portion, or achromatic part 86.

When "Register" button 83 is clicked, selection input unit 72 inputs a position registration request for requesting the registration of the achromatic pixels (S504). Moreover, selection input unit 72 inputs the positional data ($j_a$, $k_a$) that corresponds to the upper left corner 86a and the positional data ($j_b$, $k_b$) that corresponds to the right bottom corner 86b as a selected range data which shows the position range of the selected achromatic part 86. Moreover, selection input unit 72 inputs the pixel numbers $N_j \times N_k$ of the input image as the pixel number data. The input position registration request, the selected range data and pixel number data are sent to position designation unit 73 via controller 76.

When the position registration request is input (S504), position designation unit 73 which received the position registration request, the selected range data and pixel number data, first of all, based on the pixel number data, reserves a memory region for the number of the pixels of the input image as a chromatic data registration memory in chromatic data memory 74 (S505). Position designation unit 73 reserves a chromatic data registration memory of $N_j \times N_k$ bytes in chromatic data memory 74. Then, position designation unit 73 stores the data "0" as initial data in each byte of the reserved chromatic data registration memory (S505).

Subsequently, position designation unit 73, based on the selected range data, overwrites the chromatic data "1" on the address corresponding to the chromatic data registration memory, and stores the data (S506). Position designation unit 73 rewrites the data starting from the top of the chromatic data registration memory to the data of (($k_a$−1)×$N_j$+$j_a$) byte to the data "1". Similarly, data "0" stored up to (($k_a$−1)×$N_j$+$j_a$) byte for the ($j_b$−$j_a$+1) byte is rewritten to the data "1". Subsequently, the operation proceeds for ($N_j$+$j_a$−$j_b$) byte, and data "0" whose number are the ($j_b$j$_a$+1) byte, stored up from ($k_a$× $N_j$+$j_a$) byte to ($k_a$×$N_j$+$j_b$) byte is rewritten to the data "1", respectively. By continuing this operation, when data ranging from (($k_b$−1)×$N_j$+$j_a$) byte to (($k_b$−1)×$N_j$+$j_b$) byte is changed to the data "1" respectively, the registration of the chromatic data of position designation unit 73 are completed.

When the registration of the chromatic data is completed, position designation screen 80 (FIG. 14) is displayed again on display 71 (S501).

When "Print" button 84 is clicked at position designation screen 80, selection input unit 72 inputs a registration completion order which indicates that the registration of the chromatic data is completed (S507). By doing this action, the registration processes of the chromatic data at image processing device 70 are completed.

As mentioned above, the positions of the chromatic pixels are designated and registered at image processing device 70.

Subsequently, the flow of the processes for color-converting each of the input pixel signals of the input image data into the output image signals at image processing device 70 will be explained with reference to FIG. 16.

Figure 16:
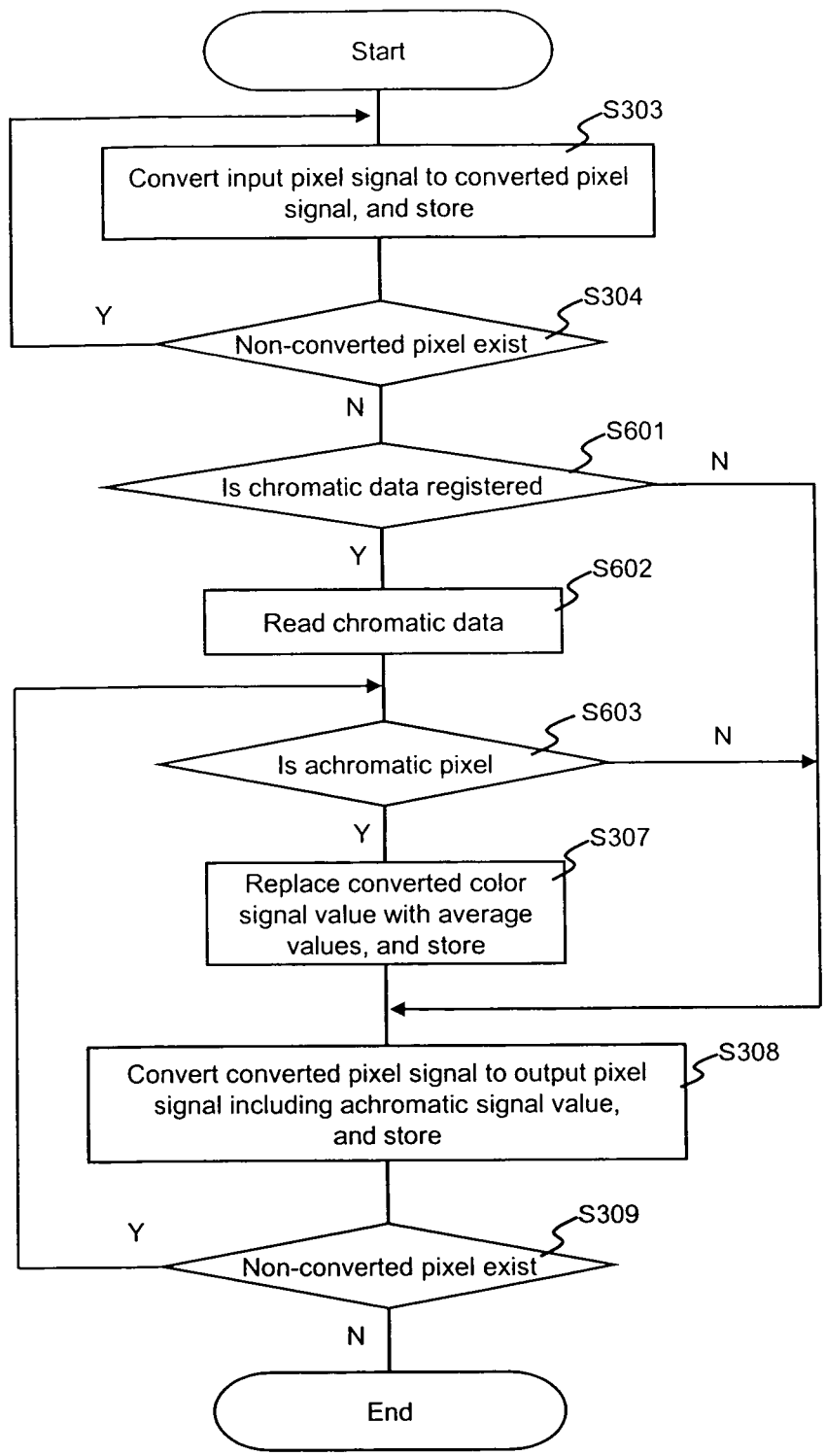
FIG. 16 is a flow diagram illustrating color convert processes of the second embodiment.

As shown in FIG. 16, at image processing device 70, each of input pixel signals corresponds to each pixel (j, k) that structures the input image stored in image data memory 23. Controller 76 sends a color conversion order to color judgment converter 75 in order to color convert these input pixel signals into converted pixel signals. Based on this color conversion order, color converter 35 reads the input color signal values corresponding to each pixel from the image data memory part along with the main scanning direction (j=1, 2 . . . ) and the sub scanning direction (k=1, 2 . . . ) in order, then converts the input color signal into the CMY value, and creates the conversion pixel signals ($C_{jk}$, $M_{jk}$, $Y_{jk}$), and stores into conversion image data memory 37 (S303).

When the converting processes with respect to all of the pixels, converting from the input pixel signals to the converted pixel signals, are completed (S304), black generator 77 creates the achromatic signal value K from the chromatic color signal values C, M and Y of each of the converted pixel signals ($C_{jk}$, $M_{jk}$, $Y_{jk}$), and converts the converted color signal values into the output color signals. A flow of processes that is executed to each pixel (j, k) at black generator 77 is described below.

First of all, black generator 77 decides whether or not the chromatic data corresponds to chromatic data memory 74 is registered in order to judge whether or not each of the pixels (j, k) is an achromatic pixel (S601). When the chromatic data registration processes (FIG. 15) are executed, and the chromatic data registration memory is set, black generator 77 decides that the chromatic data is registered (S601).

Subsequently, black generator 77 reads the chromatic data corresponding to the pixels (j, k) from the chromatic data registration memory that is set at chromatic data memory 74 (S602). Black generator 77 reads out chromatic data which is stored in an address, ((K−1)×$N_j$+j) bytes, from the ADR1 of the chromatic data registration memory.

Subsequently, black generator 77 decides whether or not the pixels (j, k) are achromatic pixels based on the read chromatic data (S603). When the chromatic data is "1," black generator 77 decides that the pixels (j, k) are achromatic pixels (S603). When the chromatic data is "0," black generator 77 decides the pixels (j, k) are not achromatic pixels (S603).

When the pixels (j, k) are decided as achromatic pixels (S603), black generator 77 reads the CMY value of the converted pixel signals ($C_{jk}$, $M_{jk}$, $Y_{jk}$) corresponding to the pixels (j, k), and calculates the average value of $A_{jk}$=($C_{jk}$+$M_{jk}$+$Y_{jk}$)/3, then replaces the CMY value of the converted pixel signals with the average value, and overwrites the converted pixel signals into ($A_{jk}$, $A_{jk}$, $A_{jk}$) (S307).

When the pixels (j, k) are decided that they are not the achromatic pixels (S603) and decided that the chromatic data is not registered (S601), black generator 77 omits replacing pixels from the converted color signal values to the average values (S307).

Subsequently, black generator 77 creates the output pixel signals ($C'_{jk}$, $M'_{jk}$, $Y'_{jk}$, $K_{jk}$) by converting the CMY value of the converted pixel signals corresponding to the pixel (j, k) to the CMYK value (S308). As the process of the converting from the converted pixel signals to the output pixel signals is the same as the first embodiment (FIG. 10), redundant description is omitted.

When the converting processes of the output pixel signals ($C'_{jk}$, $M'_{jk}$, $Y'_{jk}$, $K_{jk}$) with respect to all of the pixels are completed (S309), the color converting processes of image processing device 70 are completed.

As mentioned above, the input image data that was created at the input color space is color-converted into the output image data in the output color space by having the input pixel signals converted into the output pixel signals.

Figure 17:
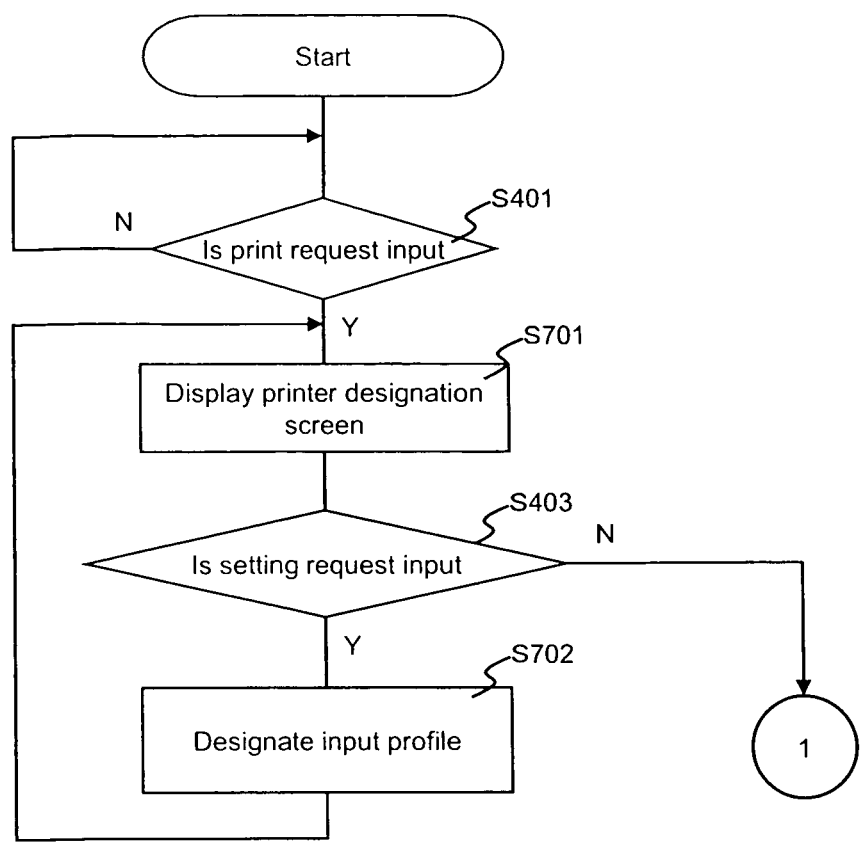
FIG. 17 is a flow diagram illustrating conversion output processes of the second embodiment (part 1).
Figure 18:
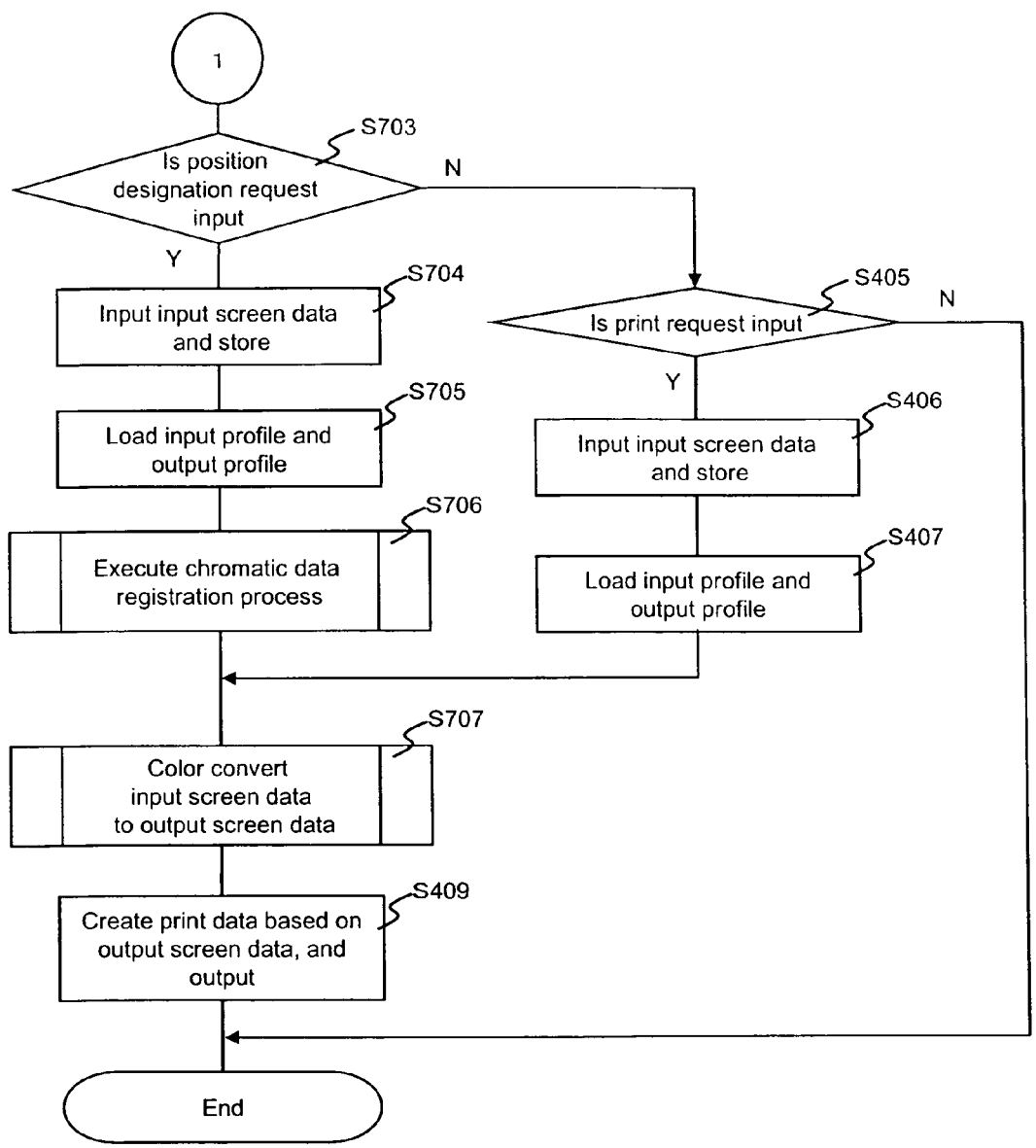
FIG. 18 is a flow diagram illustrating conversion output processes of the second embodiment (part 2).

Lastly, a flow of the processes to output the print data by executing input and color conversion of the input image data will be explained with reference to FIGS. 17 and 18.

At image processing device 70, when a print request is input from selection input unit 72 to controller 76 (S401), controller 76 controls display 71 and displays the printer designation screen (S701).

Figure 19:
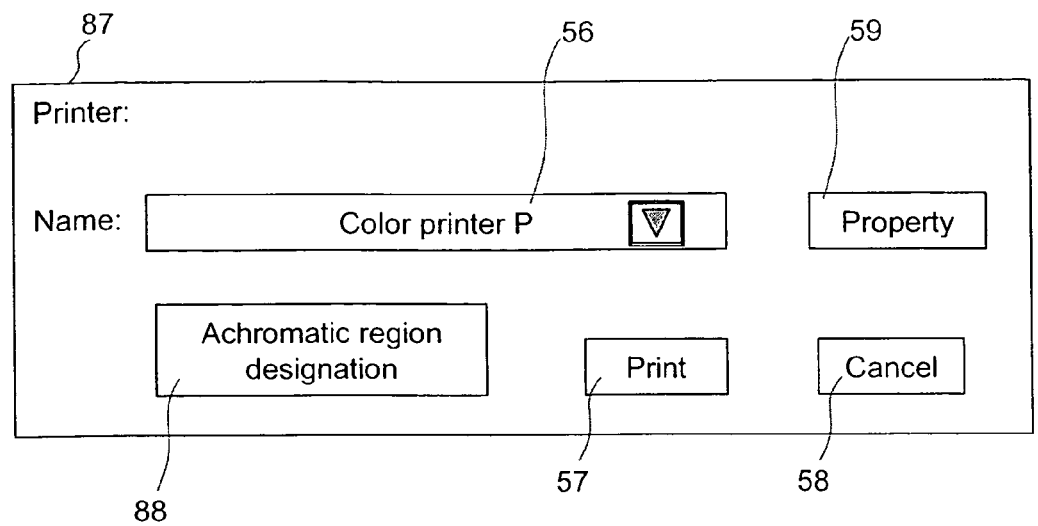
FIG. 19 is an explanatory diagram showing a structure of a printer designation screen of the second embodiment.

As shown in FIG. 19, printer designation screen 87 comprises printer selecting area 56, "Print" button 57, "Cancel" button 58, and "Property" button 59 to select the setting of the print condition. Moreover, at printer designation screen 87, "Achromatic region designation" button 88 to select the designation of the positions of the achromatic pixels is displayed.

The user operates selection input unit 72 and displays a name of the desired printer on printer selecting area 56. Moreover, the user clicks "Property" button 59 in order to set the desired print condition.

When "Property" button 59 is pressed, selection input unit 72 inputs the setting request of the print condition and the name of printer "Color printer P" as device ID information that is displayed on printer selecting area 56 to controller 76 (S403).

When the setting request is input (S403), controller 76 displays the print condition setting screen (not shown) on display 71. At this print condition setting screen, the user selects a profile name of the input profile in order to designate the input color space. Subsequently, after controller 76 designates the input color space and memorizes the profile name based on the selected profile name (S702), controller 76 displays printer designation screen 87 again on display 71.

When "achromatic region designation" button 88 is pressed at the printer designation screen 87, the selection input part 72 inputs the position destination request to request the position destination of the achromatic pixels and the device ID information "Color printer P" into controller 76 (S703).

When the position destination request is input (S703), based on control of controller 76, the image data input unit 22 inputs the input image data, and stores it in image data memory 23 (S704).

Consequently, controller 76 informs profile load unit 27 of the stored profile name and the device ID information, "Color printer P." Then, profile load unit 27 respectively reads the profile data corresponding to the profile name as an input profile and the profile data corresponding to the device ID information as an output profile from profile data memory 26, and loads the read data (S705).

Subsequently, controller 76 executes the chromatic data registration processes to designate the positions of the achromatic pixels as explained in FIG. 15 (S706).

When the chromatic data is registered by position designation unit 73 in chromatic data memory 74 (S706), controller 76 sends the color converting order to color judgment converter 75 in order to color convert the input image data into the output image data. Consequently, the color converting processes initiated by color judgment converter 75 are executed as explained in FIG. 16 (S707). Each of input pixel signals of the input image data is color converted into the output pixel signals, and the output image data is stored in converted image data memory 37 (S707).

When the output image data is created and stored (S707), controller 76 sends the transmission order of the print data and device ID information "Color printer P" to print data transmission unit 29. Consequently, print data transmission unit 29 creates the print data based on the output image data, transmits the print data to color printer 15 (S409). Accordingly, converting output processing of the image data is completed.

At printer designation screen 87 (FIG. 19), when "Print" button 57 is pressed, selection input unit 72 inputs the print request and the device ID information "Color printer P" (S405). Consequently, the input image data is input by image data input unit 22 (S406), the input profile and the output profile are loaded by profile load unit 27 (S407).

Subsequently, controller 76 sends color converting order to color judgment converter 75 in order to color convert the input image data into the output image data, then the color converting processes by color judgment converter 75 is executed as explained in FIG. 16 (S707). Consequently, print data transmission unit 29 creates the print data based on the output image data, and transmits the print data to color printer 15 (S409). The conversion output processes of image data of the image processing device are completed when the print data is transmitted to the color printer 15 (S409).

As mentioned above, based on the designated input profile and the registered chromatic data, after the input image data is color converted into the output image data, the print data is created and output. Since the user can choose whether to reproduce by a single toner or not, it is possible to provide color reproduction results based on preferences of the user.

As described above, in image processing device 70 of the exemplary embodiments, because an achromatic region can be designated by selecting a region with respect to an input image displayed on the screen regardless of the input color signal values of each pixel, operability can be improved. Moreover, even when the input color signals are same, the user can select whether or not the image is reproduced only using black toner, to provide the color reproduction results with high user satisfaction.

The above exemplary embodiments respectively adopt one designation and one judgment method with respect to the achromatic region in the input space. However, these embodiments may be implemented with other methods as well.

In each of the above embodiments, the image process device is used for a personal computer in the input side. However, it is not necessary to limit the scope of the embodiments. For example, it is practical to adapt the image process device to any image producing devices at the output side, for example, color printers or multi purpose machines (scanner, facsimile, copier, etc.) equipped with a CPU and an operation panel.

What is claimed is:

1. An image processing device for converting input image data in input color space into output image data in output color space, comprising:

an input unit configured to input a plurality of input pixel signals comprising the input image data;

a selection input unit configured to input a designation of one of a plurality of color spaces and an achromatic condition for the designated one of the plurality of color spaces according to a user's operation, the achromatic condition being a judgment equation to decide whether or not the input pixel signals are achromatic;

a designation unit configured to designate the achromatic condition for pixels corresponding to the plurality of input pixel signals, the achromatic condition being input by the user's operation via the selection input unit; and an achromatic judgment unit configured to judge whether or not each of the plurality of input pixel signals input by the input unit satisfies the achromatic condition, wherein the achromatic judgment unit judges that a pixel which corresponds to a particular input pixel signal is an achromatic pixel where the particular input pixel signal satisfies the judgment equation of the achromatic condition.

2. The image processing device according to claim 1, wherein:
the achromatic condition includes an achromatic region that designates an area in the input color space,
the achromatic judgment unit includes a decision unit configured to decide whether or not each of the input pixel signals belongs to the achromatic region, and a judgment unit configured to judge that the pixel which corresponds to the particular input pixel signal is an achromatic pixel when the decision unit decides the input pixel signal belongs to the achromatic region.

3. The image processing device according to claim 1, wherein,
the judgment equation comprises multiple judgment constitutive equations and logical equations with logical operators indicating combined relations between each of the judgment constitutive equations,
one of the logical operators is determined according to another user's operation, and
the achromatic judgment unit selects and uses the judgment constitutive equations based on the determined logical operator for judging the pixel.

4. The image processing device according to claim 1, further comprising:
a judgment equation designation screen that is configured to display the judgment equation, wherein
the judgment equation includes multiple judgment constitutive equations, and
the judgment equation designation screen displays the judgment constitutive equations to enable the user to select at least one of the judgment constitutive equations.

5. The image processing device according to claim 1, wherein
the judgment equation includes multiple judgment constitutive equations,
the judgment constitutive equations are saved as a file, and
the saved judgment constitutive equations are to be read and to be displayed to enable the user to select one or more of the judgment constitutive equations that are displayed.

6. An image processing device for converting input image data in input color space into output image data in output color space, comprising:
an input unit configured to input a plurality of input pixel signals comprising the input image data;
a designation unit configured to designate an achromatic condition for pixels corresponding to the plurality of input pixel signals; and
an achromatic judgment unit configured to judge whether or not each of the plurality of input pixel signals input by the input unit satisfies the achromatic condition, wherein
the achromatic judgment unit judges that a pixel which corresponds to a particular input pixel signal is an achromatic pixel where the particular input pixel signal satisfies the achromatic condition,
the achromatic judgment unit includes a decision unit configured to decide whether or not each of the input pixel signals belongs to the achromatic region, and a judgment unit configured to judge that the pixel which corresponds to the particular input pixel signal is an achromatic pixel when the decision unit decides the input pixel signal belongs to the achromatic region,
each of the plurality of input pixel signals includes primary color values each corresponding to a primary color number, the primary color values comprising the input color space;
the input unit is configured to input each of the primary color values,
the designation unit has a primary color number designation unit that designates the primary color number, and an equation designation unit that designates a conditional equation with respect to each of the primary color values,
the decision unit decides whether or not each of the input primary color values satisfies the conditional equation designated by equation designation unit, and
the judgment unit judges the pixel as an achromatic pixel where the decision unit decides each of the input primary color values satisfies the equation.

7. The image processing device according to claim 6, wherein:
the conditional equation designated by the equation designation unit includes a primary combined equation including the primary color values, an upper limit of the primary combined equation, and a lower limit of the primary combined equation; and
the equation designation unit designates coefficients with respect to each of the primary color values included in the primary combined equation, the upper limit and the lower limit.

8. The image processing device according to claim 7, wherein
the primary combined equation is a sum of multiple products of a coefficient designated by the equation designation unit and a signal value of the plurality of input color pixel signals (a1×x1+a2×x2 . . . ai×xi), wherein "a" represents the coefficient, "x" represents the signal value, and "i" represents identification data; and
the identification data "i" corresponds to the primary color number.

9. The image processing device according to claim 7, further comprising:
a chromatic data memory configured to store chromatic data indicating whether or not the pixel is the achromatic pixel and corresponding to positional data of each of the pixels, wherein
the designation unit designates the chromatic data based on the positional data.

* * * * *